United States Patent [19]

Kikuchi

[11] Patent Number: 4,861,145

[45] Date of Patent: Aug. 29, 1989

[54] SMALL-SIZE ZOOM LENS OF WIDELY VARIABLE MAGNIFICATION

[75] Inventor: Shuichi Kikuchi, Yokohama, Japan

[73] Assignee: Ricoh Company, Ltd., Tokyo, Japan

[21] Appl. No.: 213,250

[22] Filed: Jun. 29, 1988

[30] Foreign Application Priority Data

Jun. 30, 1987 [JP] Japan ............................. 62-163696
Jun. 30, 1987 [JP] Japan ............................. 62-163697

[51] Int. Cl.⁴ .................... G02B 15/20; G02B 15/22
[52] U.S. Cl. ................................... 350/427; 350/428
[58] Field of Search ..................... 350/423, 427, 428

[56] References Cited

U.S. PATENT DOCUMENTS

| 4,629,294 | 12/1986 | Tanaka et al. | 350/427 |
| 4,639,096 | 1/1987 | Kitaghishi et al. | 350/427 |
| 4,712,883 | 12/1987 | Kato et al. | 350/427 |

*Primary Examiner*—Bruce Y. Arnold
*Assistant Examiner*—Scott J. Sugarman
*Attorney, Agent, or Firm*—Oblon, Spivak, McClelland, Maier & Neustadt

[57] ABSTRACT

A zoom lens comprises successively in order from an object toward an image, a first lens group having positive refracting power, a second lens group having negative refracting power, a third lens group having positive refracting power, a fourth lens group having positive refracting power, and a fifth lens unit having negative refracting power. When the zoom lens is zoomed from a wide angle setting to a telephoto setting, the first lens group, the third lens group, the fourth lens group, and the fifth lens unit are moved toward the object, whereas the second lens group is moved toward the image. The zoom lens meets the following conditions:

(i) $1.5 < |f_5/f_W| < 6$
(ii) $f_4 > |f_5|$
(iii) $D_{3W} > D_{3M}$ where $f_4$ is the focal length of the fourth lens group, $f_5$ is the focal length of the fifth lens unit, $f_W$ is the focal length of the zoom lens at the wide angle end, $D_{3W}$ is the distance between the third and fourth lens groups at the wide angle end, and $D_{3M}$ is the distance between the third and fourth lens groups when the focal length of the zoom lens is $$f_M = \sqrt{f_W \cdot f_T}$$

where $f_T$ is the focal length of the zoom lens at the telephoto end.

5 Claims, 17 Drawing Sheets f = 36
f = 68.673
f = 131

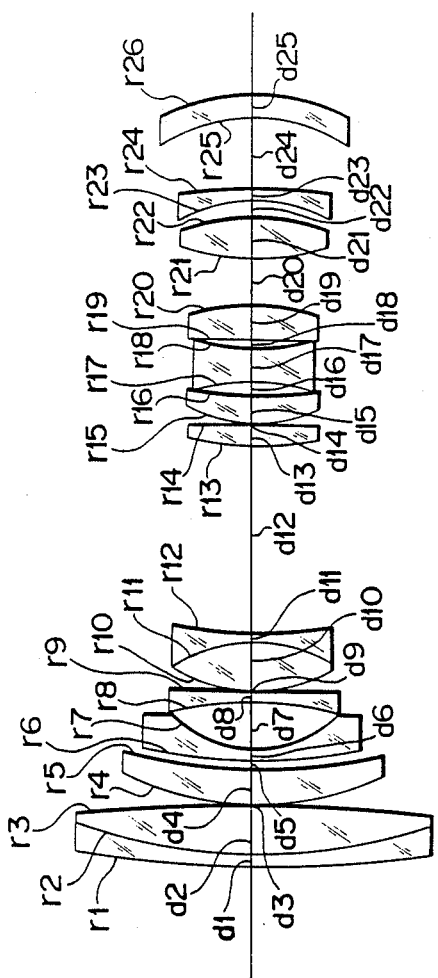
FIG. 3
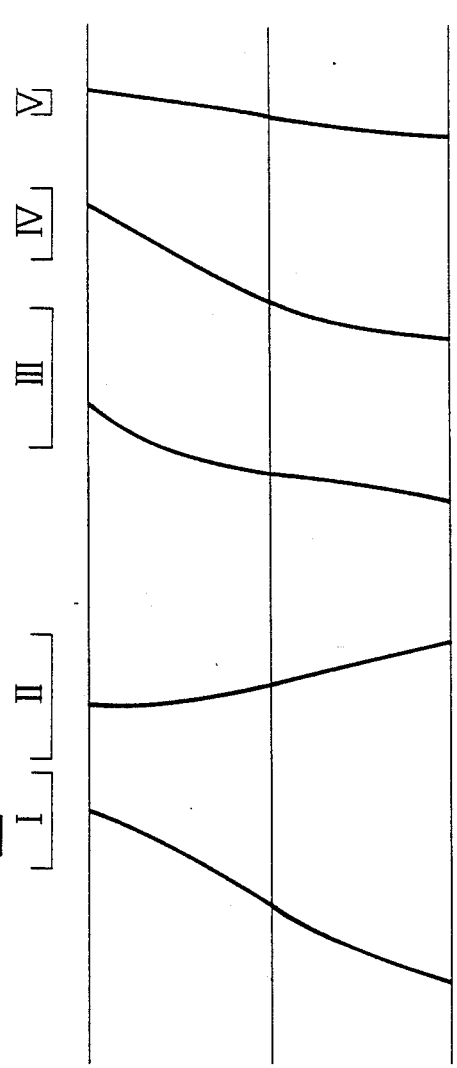
f = 36
f = 68.673
f = 131

FIG. 10
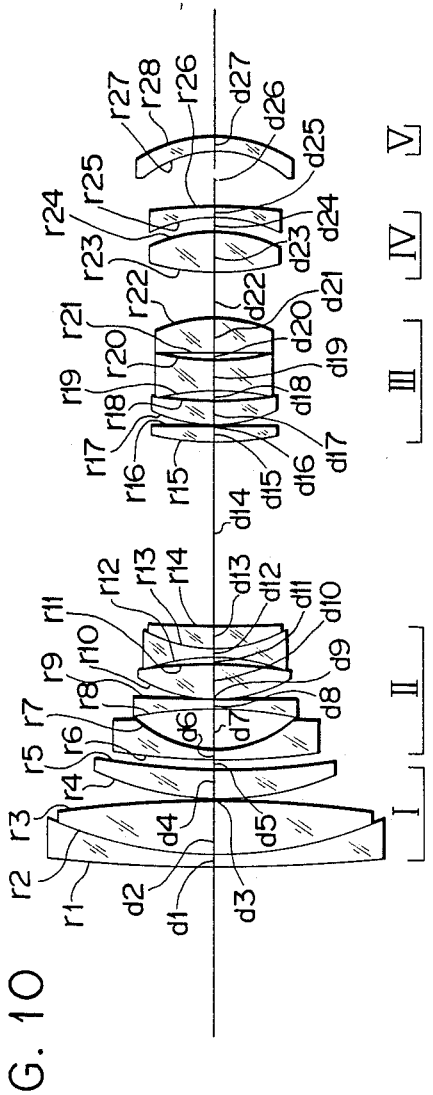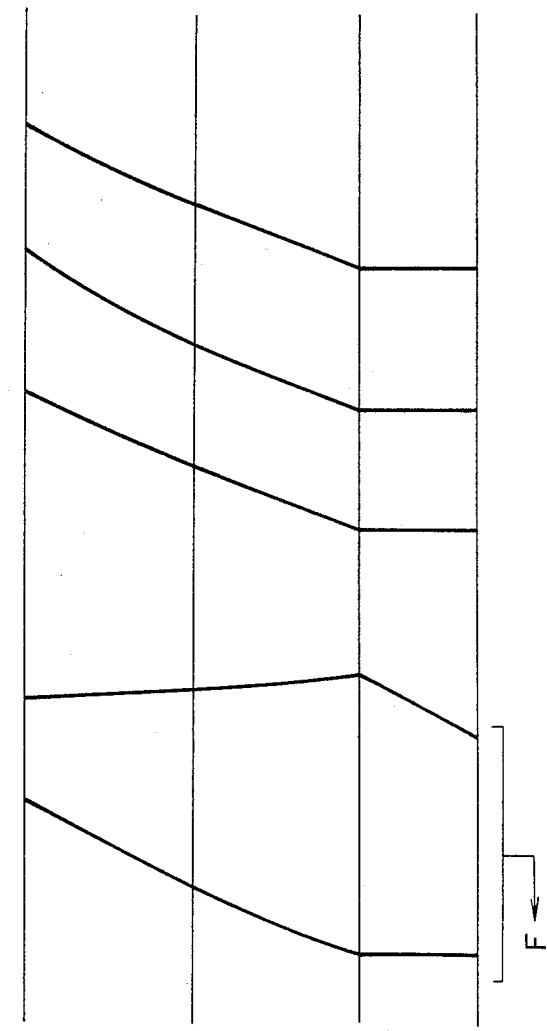
f = 36
f = 68.673
f = 131
CLOSE-UPS
CAN BE
PHOTOGRAPHED
F

FIG. 14
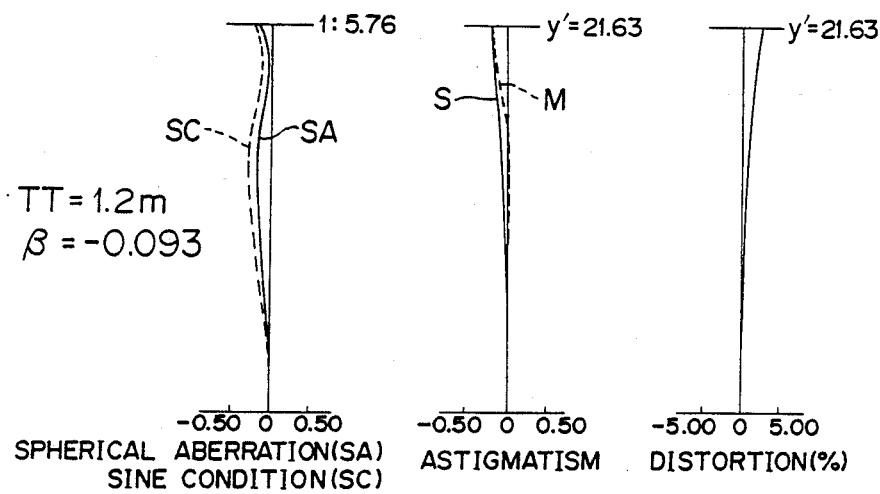
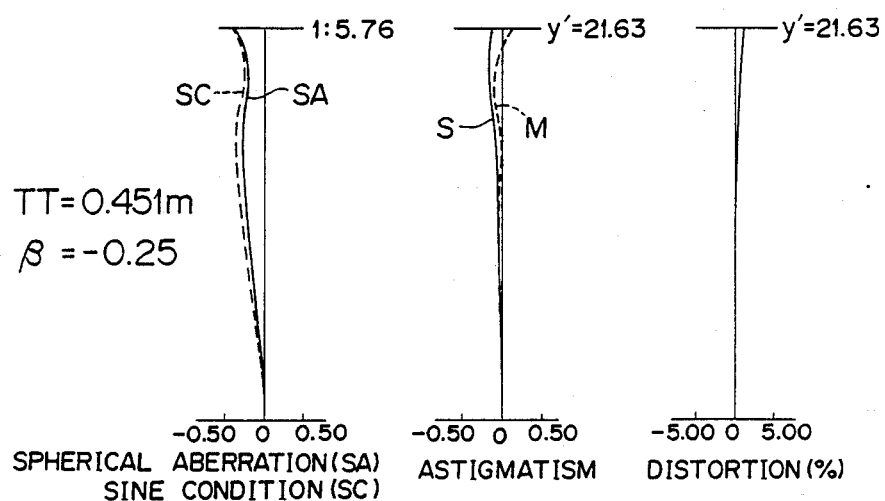

F I G. 16
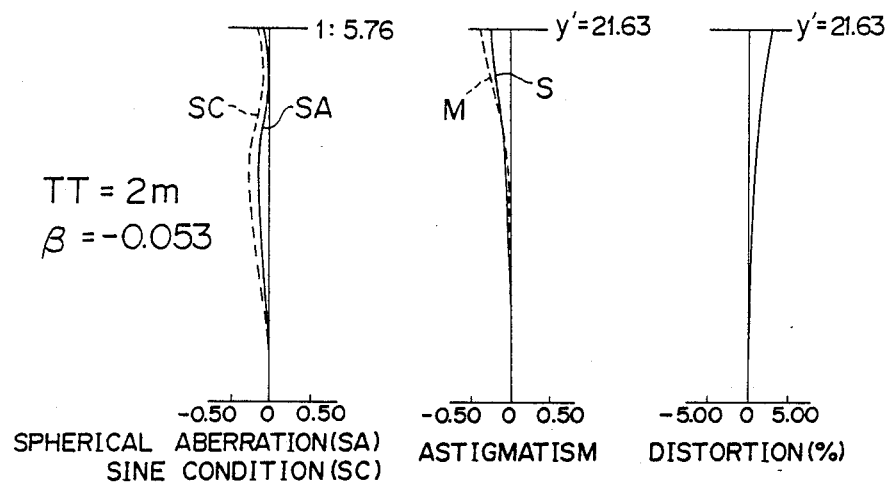
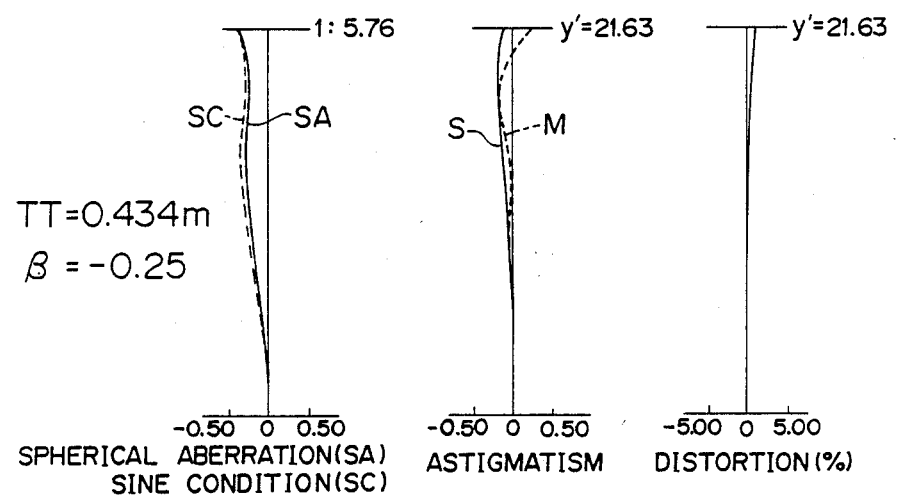

SMALL-SIZE ZOOM LENS OF WIDELY VARIABLE MAGNIFICATION

BACKGROUND OF THE INVENTION

1. Field of the Invention

The present invention relates to a zoom lens of a small size and widely variable magnification.

2. Discussion of the Background

Zoom lenses having a field angle ranging from 62° to 19° are disclosed in Japanese Laid-Open patent Publications Nos. 56-133713, 57-164709, 59-160121, 60-14212, 61-62012, and 61-69016, for example. The disclosed zoom lenses are not compact since the ratio ($L/f_T$) of the overall length L of the lens system (from the front lens surface to the image plane at the wide angle end) to the focal length $f_T$ at the telephoto end is greater than 1.

The most general way of focusing a zoom lens is to move the first lens group of the zoom lens. This method is advantageous in that the amount of movement of the first lens group remains unchanged at all focal length settings. However, if a zoom lens has a wide angle setting and the first lens group has positive refracting power, then the vignetting becomes greater unless the diameter of the front lens element is increased. If the diameter of the front lens element is increased, then the zoom lens becomes heavier, larger, and more costly.

One solutionn to the above problems is to move, in unison, a first lens group having positive refracting power and a second lens group having negative refracting power. Since the combined power of the first and second lens groups is large in the wide angle end, the amount of movement of the first and second lens groups is small, and the front lens element can be reduced in diameter. However, close ranges in a zooming range are limited in view of the amount of movement in unison of the first and lens groups, the diameter of the front lens element, and the performance thereof.

SUMMARY OF THE INVENTION

It is an object of the present invention to provide a highly compact zoom lens of widely variable magnification which has a wide field angle of about 62°, and a high magnification ratio of about 3.6 or greater, and in which the ratio of the overall length of the lens system at a wide angle end to the focal length thereof at a telephoto end is smaller than 1.

Another object of the present invention is to provide a zoom lens which is of a small size, has a high magnification ratio, can photograph close-ups, can be focused by a focusing lens group, and is free from extensive vignetting.

According to the present invention, a zoom lens comprises, successively in order from an object toward an image, a first lens group having positive refracting power, a second lens group having negative refracting power, a third lens group having positive refracting power, a fourth lens group having positive refracting power, and a fifth lens unit having negative refracting power. When the zoom lens is zoomed from a wide angle setting to a telephoto setting, the first lens group, the third lens group, the fourth lens group, and the fifth lens unit are moved toward the object, whereas the second lens group is moved toward the image.

The zoom lens of the present invention meets the following conditions:

(i) $1.5 < |f_5/f_W| < 6$ (ii) $f_4 > |f_5|$ (iii) $D_{3W} > D_{3M}$ where $f_4$ is the focal length of the fourth lens group, $f_5$ is the focal length of the fifth lens unit, $f_W$ is the focal length of the zoom lens at the wide angle end, $D_{3W}$ is the distance between the third and fourth lens groups at the wide angle end, and $D_{3M}$ is the distance between the third and fourth lens groups when the focal length of the zoom lens is $$f_M = \sqrt{f_W \cdot f_T}$$

where $f_T$ is the focal length of the zoom lens at the telephoto end.

A zoom lens, which is capable of photographing close-ups, has, in addition to the above features, at least the second lens group displaced a predetermined distance from the telephoto setting toward the object, outside of a zooming range, and fixed to the displaced position for photographing close-ups. The zoom lens is focused, in the zooming range and also for photographing close-ups, by moving the first and second lens groups in unison with each other. For photographing close-ups, the zoom lens can be focused to close ranges in excess of an ordinary photographing range.

The zoom lens according to the present invention includes a wide angle setting and can achieve a high magnification ratio. The zoom lens has good performance and is compact, allowing a space to be kept behind the lens for positioning a viewfinder mirror.

The zoom lens capable of photographing close-ups can photograph the object at a reduction ratio of about ¼. The zoom lens has good focusing performance, can be focused by a focusing zoom lens, and is free from extensive vignetting.

The zoom lens includes a wide angle setting, has a high magnification ratio, and is compact. The zoom lens can be employed in a 35 mm single-lens reflex camera which can photograph close-ups.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a view of a small-size zoom lens of widely variable magnification according to still another example, the view also showing relative displacement of lens groups when zooming the lens;

FIG. 10 is a view of a zoom lens capable of photographing close-ups according to the present invention;

FIGS. 12 through 17 are diagrams showing aberrations of examples of the zoom lens of FIG. 10.

DESCRIPTION OF THE PREFERRED EMBODIMENTS

Figure 1:
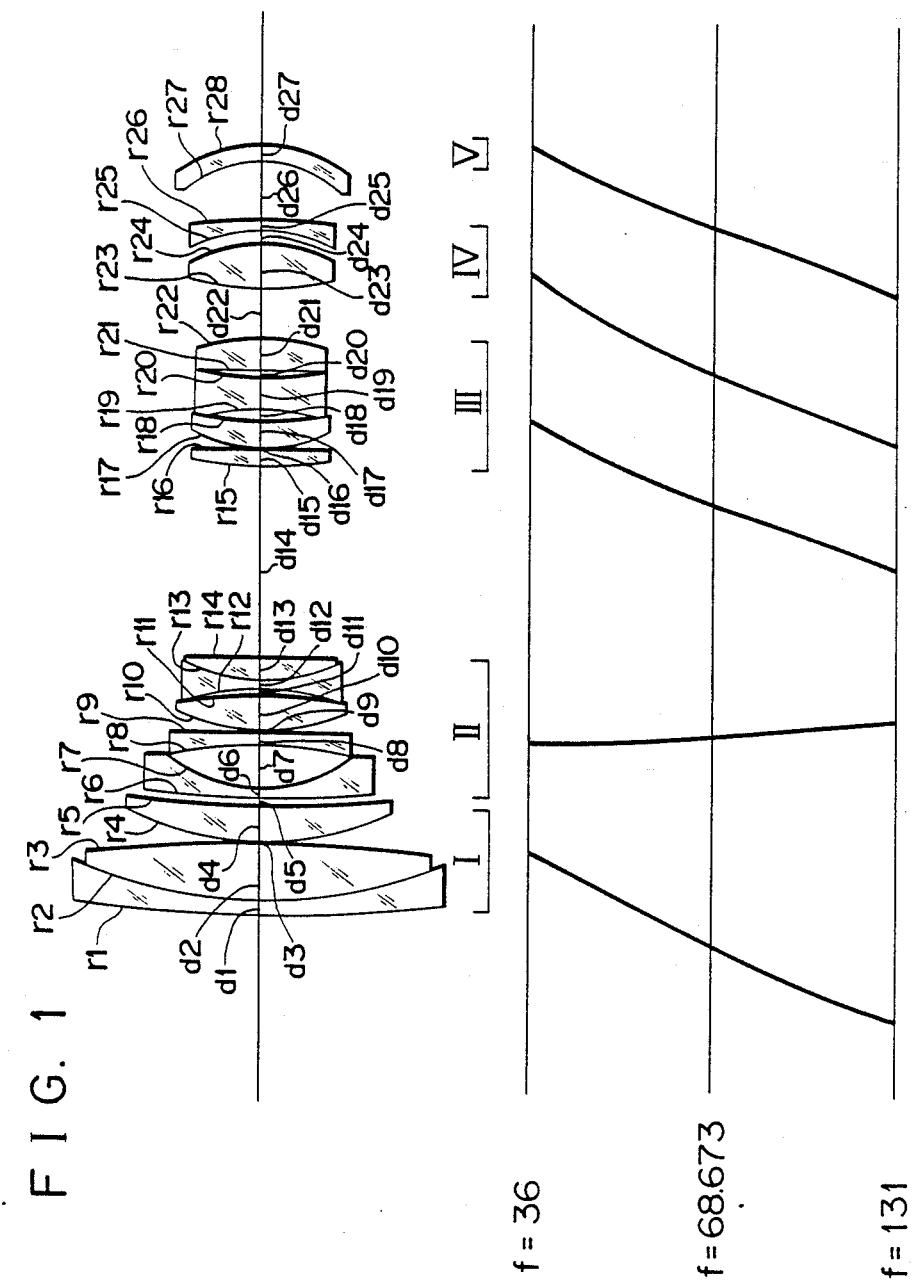
FIG. 1 is a view of a small-size zoom lens of widely variable magnification according to an example of the present invention, the view also showing relative displacement of lens groups when zooming the lens.

According to the present invention, as shown in FIG. 1 of the accompanying drawings, a zoom lens comprises, successively in order from an object toward an image, a first lens group I having positive refracting power, a second lens group II having negative refracting power, a third lens group III having positive refracting power, a fourth lens group IV having positive refracting power, and a fifth lens unit V having negative refracting power. When the zoom lens is zoomed from a wide angle setting to a telephoto setting, the first lens group I, the third lens group III, the fourth lens group IV, and the fifth lens unit V are moved toward the object, whereas the second lens group is moved toward the image.

The zoom lens of the present invention meets the following conditions:

(i) $1.5 < |f_5/f_W| < 6$
(ii) $f_4 > |f_5|$
(iii) $D_{3W} > D_{3M}$ where $f_4$ is the focal length of the fourth lens group, $f_5$ is the focal length of the fifth lens unit, $f_W$ is the focal length of the zoom lens at the wide angle end, $D_{3W}$ is the distance between the third and fourth lens groups at the wide angle end, and $D_{3M}$ is the distance between the third and fourth lens groups when the focal length of the zoom lens is $$f_M = \sqrt{f_W \cdot f_T}$$

where $f_T$ is the focal length of the zoom lens at the telephoto end.

The zoom lens of a small size and a high magnification ratio according to the present invention has a smallest overall length at a wide angle end. It is now assumed that at the wide angle end, first through fourth lens groups have refracting power $\phi_{1\sim4}$, a fifth lens unit has refracting power $\phi_5$, the distance from a rear principal point of the combined system of the first through fourth lens groups to a front principal point of the fifth lens unit is $d_W$, the entire zoom lens has refracting power $\phi_W$, the distance from front to rear principal points of the combined system of the first through fourth lens groups is $HH'_{1\sim4W}$, the distance from front to rear principal points of the fifth lens unit is $HH'_{5W}$, the distance from the front principal point of the combined system of the first through fourth lens groups to an image plane of the entire zoom lens is $TL_W$, and the distance from the rear principal point of the fifth lens unit to the image plane of the entire zoom lens is $BF_W$. The direction from the object toward the image plane is assumed to be positive.

The following equation is now established:

$$TL_W = BF_W + d_W + HH'_{1\sim4W} + HH'_{5W} \tag{1}$$

where $$BF_W = (1 - \phi_W \cdot d_W)/\{\phi_W \cdot (1 - \phi_5 \cdot d_W)\} \tag{2}$$

For the lens having a focal length of about 35 mm at the wide angle end according to the present invention, it is preferable that $$BF_W > (1/\phi_W) \tag{3}$$

in order to keep a back focus for use in a single-lens reflex camera.

From the equations (2) and (3), any of the following four conditions can be established:

(1) $d_W > 0$ and $\phi_W < \phi_5 < (1/d_W)$ \hfill (4)

(2) $d_W > 0$ and $(1/d_W) < \phi_5 < \phi_W$ \hfill (5)

(3) $d_W < 0$ and $\phi_W > \phi_5 < (1/d_W)$ \hfill (6)

(4) $d_W < 0$ and $(1/d_W) > \phi_5 > \phi_W$ \hfill (7)

In order to reduce $TL_W$, $d_W < 0$ is advantageous from the equation (1). Since $\phi_W > 0$, meeting the condition (6) is a condition to keep a back focus and reduce the overall length.

From (2), we get $$\phi_W \cdot d_W = (BF_W \cdot \phi_W - 1)/(BF_W \cdot \phi_5 - 1) \tag{8}$$

Figure 9:
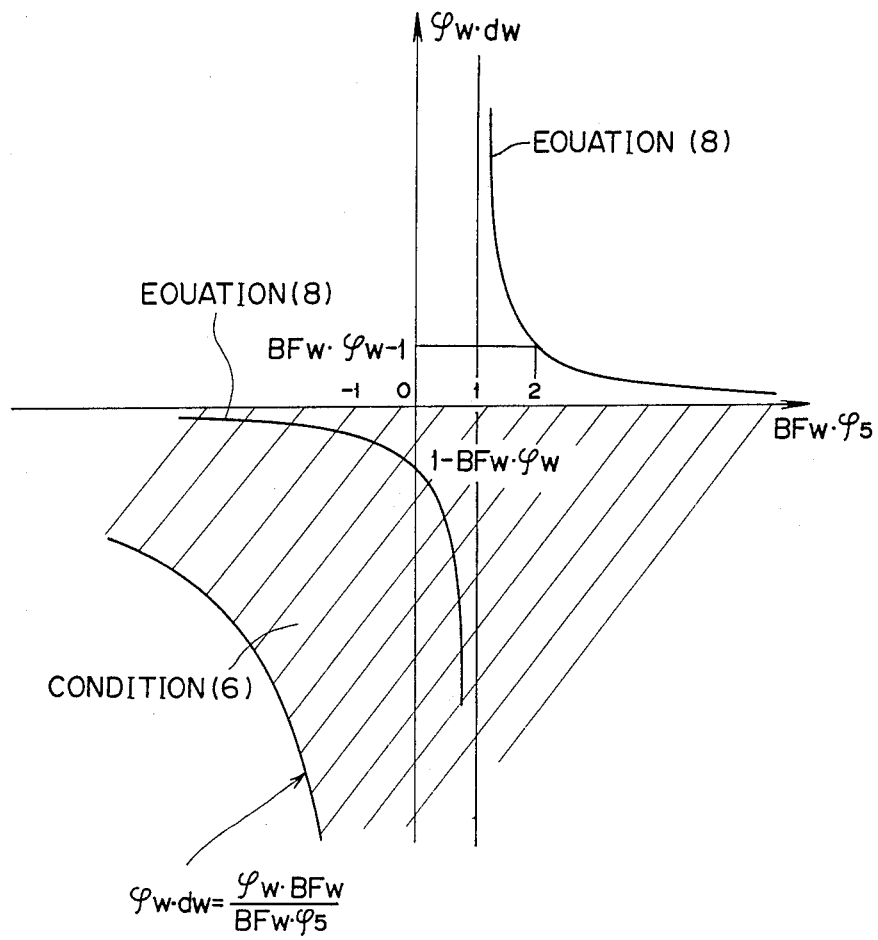
FIG. 9 is a diagram explaining conditions met by the zoom lens of the present invention.

FIG. 9 shows the equation (8) and the condition (6).

As $BF_W \cdot \phi_5$ approaches 1 from a smaller value, $\phi_W \cdot d_W$ becomes smaller. If $\phi_W \cdot d_W$ were too small, it would be difficult to maintain a required distance between the fourth lens group and fifth lens unit. If $BF_W \cdot \phi_5$ were too small, the overall lens length would not fully be reduced.

Zooming the lens from the wide angle setting to the telephoto setting will now be described below.

Assuming that the focal length is $f_1$, the magnifications of the second through fourth lens groups and fifth lens unit at the wide angle end are $M_{2W}$, $M_{3W}$, $M_{4W}$, $M_{5W}$, respectively, and the magnifications of the second through fourth lens group and fifth lens unit at the telephoto end are $M_{2T}$, $M_{3T}$, $M_{4T}$, $M_{5T}$, respectively, the focal length $f_W$ of the zoom lens at the wide angle end and the focal length $f_T$ of the zoom lens at the telephoto end can be expressed as follows:

$$f_W = f_1 \cdot M_{2W} \cdot M_{3W} \cdot M_{4W} \cdot M_{5W} \tag{9}$$

$$f_T = f_1 \cdot M_{2T} \cdot M_{3T} \cdot M_{4T} \cdot M_{5T} \tag{10}$$

Therefore, it is preferable that $M_{5W} < M_{5T}$.

The magnification $M_{5W}$ at the wide angle end can be pressed as:

$$M_{5W} = 1 - \phi_5 \cdot BF_W \tag{11}$$

If the distance from the rear principal point of the fifth lens unit to the image plane of the zoom lens at the telephoto end is $BF_T$, then the magnification $M_{5T}$ is given by:

$$M_{5T} = 1 - \phi_5 \cdot BF_T \qquad (12)$$

Therefore, the magnification ratio $M^5{}_T/M^5{}_W$ of the fifth lens unit is expressed by:

$$M_{5T}/M_{5W} = (1 - \phi_5 \cdot BF_T)/(1 - \phi_5 \cdot BF_M) \qquad (13)$$

In order to meet the condition $M_{5W} < M_{5T}$, it is necessary to meet:

$$(1 - \phi_5 \cdot BF_T)/(1 - \phi_5 \cdot BF_M) < 1 \qquad (14)$$

Since $$1 - \phi_5 \cdot BF_W < 0 \text{ we get } \phi_5 \cdot (BF_T - BF_W) > 0 \qquad (15)$$

Therefore, any of the following conditions can be established:

$$(5) \; \phi_5 < 0 \text{ and } BF_T - BF_W > 0 \qquad (16)$$

$$(6) \; \phi_5 > 0 \text{ and } BF_T - BF_W < 0 \qquad (17)$$

Inasmuch as the back focus is minimized at the wide angle end under the condition (6), the condition (5) must be met. If the amount of movement of the fifth lens unit is constant when zooming the lens from the wide angle setting to the telephoto setting, then $$\Delta(M_{5T}/M_{5W}) = \{(BF_T - BF_W)/(1 - 100_5 \cdot BF_W)^2\} \cdot \Delta\phi_5 \qquad (18)$$

It will be understood that the smaller $\phi_5$, the larger the magnification ratio. Therefore, according to the present invention, the fifth lens unit is given negative refracting power, and is moved toward the object when zooming the zoom lens from the wide angle setting to the telephoto setting. At this time, the focal length of the fifth lens unit satisfies the condition (i).

The condition (ii) serves mainly to keep a desired distance between the second and third lens groups at the telephoto end.

The magnification of the fourth lens group is reduced when zooming the zoom lens from the wide angle setting to the telephoto setting. That is, when the focal length of the overall zoom lens is increased upon zooming, the fourth lens group is moved in a direction to reduce the focal length of the overall zoom lens. Conversely, when zooming the zoom lens from the wide angle setting to the telephoto setting, the magnification of the fifth lens unit is increased to increase the focal length of the zoom lens. Consequently, if the focal length of the fourth lens group is reduced as compared with the absolute value of the focal length of the fifth lens unit, then the magnification ratios of the second and third lens groups have to be increased, making it difficult to keep a desired distance between the second and third lens groups.

The fourth lens group is a lens group for assisting the third lens group in focusing the image. The combined system of the third and fourth lens groups therefore have an image focusing function. When the zoom lens of the invention is zoomed, the distance between the third and fourth lens groups is varied to correct astigmatism and keep the meridional image surface proper.

Near an intermediate position between the wide angle end and the telephoto end, i.e., near the focal length $$f_M = \sqrt{f_M \cdot f_T},$$

an excessively corrected image plane can be kept proper by reducing the distance between the third and fourth lens groups. This is what the condition (iii) means.

By meeting the above conditions, there can be achieved a good-performance, compact zoom lens which has a field angle of 62° and a magnification ratio of 3.6 or higher.

To simplify the mechanical mechanism associated with the zoom lens, the third group and fifth unit may be arranged to move in unison with each other.

With the above arrangement, it is possible to reduce the amount of performance deterioration of the zoom lens and lower the cost of the zoom lens.

For correcting aberrations, the zoom lens of the present invention should preferably arranged as follows:

(A) The second lens group comprises three negative lenses and one or more positive lenses, the first lens being a meniscus negative lens having a concave surface facing the image plane and the second lens being a negative lens having a concave lens facing the object.

(B) Assuming that the radius of curvature of the surface, facing the object and contacting air, of the positive lens of the second lens group is $R_{1F}$, and the focal length of the second lens group is $f_2$, $R_{1F}$ exists which satisfies:

$$(iv) \; 1 < |R_{1F}/f_2| < 1.6$$

(C) The fourth lens group includes a first lens comprising a double-convex lens having a surface of small radius of curvature which faces the image plane and a second lens comprising a meniscus negative lens with its concave surface facing the object.

(D) Assuming that the radius of curvature of the surface of the positive first lens which faces the image plane is $R_{4,2}$, and the radius of curvature of the surface of the second negative lens which faces the object is $R_{4,3}$, the following condition:

$$(v) \; 1.1 < R_{4,2}/R_{4,3} < 1.8$$

is satisfied.

These supplemental conditions will be described below. When the zoom lens of the invention is zoomed from the wide angle setting to the telephoto setting, the magnification of the second lens group is increased by widening the distance between the first and second lens groups.

When zooming the zoom lens from the wide angle setting to the telephoto setting, the third lens group is moved toward the object and approaches the second lens group. Therefore, the height of the light rays passing through the second lens group is largely varied upon zooming the zoom lens, and the manner in which the aberrations are produced is also largely varied. Thus, it would be highly difficult to correct the aberrations.

The arrangement of (A) described above is effective in solving the above problem. The condition (iv) is a condition which should be met by the positive lens to eliminate the above problem. If the upper limit of the condition (iv) were exceeded, then the Petzval sum would be reduced, which could not be corrected properly. If the lower limit were exceeded, then the power of this surface would become too strong, and higher-order coma would be produced, which could not be corrected properly.

The distance between the third and fourth lens groups can be kept by making the fourth lens group a telephoto-type lens group as indicated by the condition (C). By satisfying the condition (v), furthermore, it is possible to correct spherical aberration and coma. If the upper limit of the condition (v) were exceeded, then spherical aberration and coma would be corrected excessively, and if the lower limit were exceeded, these aberrations would not be corrected sufficiently.

Now, conditions for making it possible to photograph close-ups will be described below.

In the described which follows, the direction from an object to be photographed toward a film surface is assumed to be positive.

First, a mode in which only the second lens group is displaced to photograph close-ups will be described.

Assuming that the first lens group has power $\phi_1$ at the telephoto end, the second lens group has power $\phi_2$, the distance between principal points thereof is $d_1$, the combined system of the first and second lens groups has power $\phi_{1,2}$, and the distance from the rear principal point of the second lens group to the rear focal point of the combined system of the first and second lens groups is $bf'_{1,2}$, the following equation (19) can be established:

$$bf'_{1,2} = (1 - \phi_1 \cdot d_1)/\phi_{1,2} \quad (19)$$

Assuming that the distance between the principal points of the first and second lens groups after the second lens group has been displaced from the telephoto end is $d_{1m}$, the power of the combined system of the first and second lens groups is $\phi_{1,2m}$, and the distance from the rear principal point of the second lens group to the rear focal point of the combined system of the first and second lens groups is $bf'_{1,2m}$, the equation (20) can be established:

$$bf'_{1,2m} - bf'_{1,2} = \phi_1^2 \cdot (d_1 - d_{1m})/(\phi_{1,2m} \cdot \phi_{1,2}) \quad (20)$$

The amount $\Delta F_{1,2}$ of displacement of the rear focal point of the combined system of the first and second lens groups is given by the following equation (21):

$$\Delta F_{1,2} = (\phi_{1,2m} \cdot \phi_{1,2} - \phi_1^2) \cdot (d_{1m} - d_1)/(\phi_{1,2m} \cdot \phi_{1,2}) \quad (21)$$

$\Delta_{1,2}$ is assumed to be positive when the focal point is displaced toward the image plane of the entire zoom lens.

It is assumed that the second lens group is displaced toward the object to reduce the vignetting. When $$d_{1m} < \{(\phi_1 + \phi_2) \cdot \phi_{1,2} - \phi_1^2\}/(\phi_1 \cdot \phi_2 \cdot \phi_{1,2}) \quad (22)$$

can be established, the rear focal point of the combined system of the first and second lens groups is displaced toward the object, and hence the zoom lens is focused on the object at a finite distance, from the condition in which it is focused on $\infty$.

It is assumed that when the second lens group is displaced toward the object, and then the first and second lens group are moved in unison for photographing a closeup, the magnification of the engine zoom lens is $\beta_m$, the combine power of the first and second lens group is $\phi_{1,2m}$, the power of the entire zoom lens is $\phi_m$, and the distance from the front principal point to the rear principal point of the entire zoom lens is $HH'_m$, the distance $TT_m$ from the object to be photographed in a close range to a film surface is given by:

$$TT_m = -(1 - \beta_m)^2/(\beta_m \cdot \phi_m) + HH'_m \quad (23)$$

It is assumed that when there is no focusing movement, the distance from the focused object to the film surface is $TT_i$, and the distance from the front lens surface to the film surface is $TL_i$, and when photographing a close-up, the distance from the front lens surface to the film surface is $TL_m$, and the distance from the front lens surface to the front focal point of the combined system of the first and second lens group is $bf_{1,2m}$. At this time, the amount $X'_m$ of movement in unison of the first and second lens groups is expressed by:

$$X'_m = (1/\phi_{1,2m}^2) \cdot \{1/(TT_m - TL_m + bf_{1,2m}) - 1/(TT_i - TL_i + bf_{1,2m})\} \quad (24)$$

$X'_m$ is positive when the lens groups are moved toward the object. If $$A = HH'_m - TL_m + bf_{1,2m}$$

$$B = (1 - \beta_m)^2/\beta_m$$

$$C = TT_i - TL_i + bf_{1,2m}$$

then we have $$X'_m = (1/\phi_{1,2m}^2) \cdot \{1/(A - B/\phi_m) - 1/C\} \quad (25)$$

When the second lens group is displaced toward the object to increase $\phi_{1,2m}$ negatively, the amount of movement of the first and second lens groups to obtain the desired magnification $\beta_m$ becomes small. When the second lens group is displaced toward the object to reduce the distance between the first and second lens groups, the vignetting is reduced. This is because the angle of an off-axis light ray with respect to the optical axis between the first and second lens groups is larger than that following the second lens group. By thus displacing the second lens group from the telephoto end toward the object and fixing the second lens group in a position to focus the zoom lens at a finite distance, and further moving the first and second lens groups in unison, it becomes possible to photograph closeups, and a desired photographing magnification can be obtained. Moreover, the vignetting is small and any performance deterioration is low.

Next, displacement of the second lens group together with the first lens group from the telephoto end toward the object will be described.

At this time, the amount of movement of the second lens group to focus the zoom lens at a certain distance may be smaller than the amount of movement to be achieved when only the second lens is displaced. However, since the distance between the first and second lens groups is increased by displacing the first lens group toward the object, the vignetting becomes larger than when only the second lens group is displaced. Furthermore, inasmuch as the power of the combined system of the first and second lens groups is reduced, in order to obtain the same magnification for photographing close-ups, it is necessary to increase the amount of movement if the focusing distance when there is no lens movement should remain unchanged, and it is necessary to reduce the focusing distance when there is no lens movement if the amount of lens movement should remain unchanged.

Displacement of the second lens group toward the object and the third lens group through fifth lens unit toward the image plane will be described below.

It is assumed that the power of the combined system of the third lens group through fifth lens unit is $\phi_{3-5}$, and the distance from the rear principal point of the combined system of the third lens group through fifth lens unit to the rear focal point of the entire zoom lens is bf'. Then, the magnification $\beta_{3-5}$ of the combined system of the third lens group through fifth lens unit is given as follows:

$$\beta_{3-5} = 1 - \phi_{3-5} \cdot bf' \quad (26)$$

It is also assumed that the distance from the rear focal point of the combined system of the third lens group through fifth lens unit to the film surface is $X'_{3-5}$, the distance from the front focal point of the same combined system to the position of the point on the object side, which is conjugate to the object image on the film surface formed by the third lens group, the fourth lens group, and the fifth lens unit is $X_{3-5}$, the distance from the object to the film surface is $TT_{3-5}$, and the distance from the front principal point to the rear principal point of the combined system of the third lens group through fifth lens unit is $HH'_{3-5}$. Then, these parameters are related as follows:

$$\begin{aligned} TT_{3-5} &= X'_{3-5} - X_{3-5} + 2/\phi_{3-5} + HH'_{3-5} \\ &= (1 + X'^2_{3-5} \cdot \phi^2_{3-5})/(X'_{3-5} \cdot \phi^2_{3-5}) + \\ &\quad 2/\phi_{3-5} + HH'_{3-5} \end{aligned} \quad (27)$$

If minute changes of $TT_{3-5}$ and $X'_{3-5}$ are expressed as $\Delta TT_{3-5}$ and $\Delta X'_{3-5}$, respectively, then the following equation (28) is established:

$$\Delta TT_{3=5} = \{(X'^2_{3-5} \cdot \phi^2_{3-5} - 1)/(X'^2_{3-5} \cdot \phi^2_{3-5})\} \cdot \Delta X'_{3-5} \quad (28)$$

Therefore, by displacing the combined system of the third lens group through fifth lens unit toward the image plane so as to satisfy:

$$X'^2_{3-5} \cdot \phi^2_{3-5} - 1 > 0, \text{ i.e.,} \quad (29)$$

$$\beta_{3-5} < -1$$

and $$2 < \phi_{3-5} \cdot bf' \quad (30)$$

from the equation (26), the position of the point on the object side, which is conjugate to the object image on the film surface formed by the third lens group, the fourth lens group and the fifth lens unit is displaced toward the image plane, so that the amount of displacement of the second lens group for focusing the zoom lens at a prescribed distance to the object when there is no lens movement may be small. If the third lens group through fifth lens unit are moved toward the image surface, the distance between the principal points of the combined system of the first and second lens groups and the combined system of the third lens group through fifth lens unit is increased, and so is the power of the entire zoom lens. Therefore, the amount of the movement in unison of the first and second lens groups to obtain the desired magnification is increased. In order to reduced this amount of movement, it is necessary to reduce the focusing distance to the object when there is no lens movement. The vignetting is increased also when the third lens group through fifth lens unit are displaced toward the object. If the displacement of the fourth lens group is reduced when the third lens group through fifth lens unit are displaced toward the image plane, the amounts of displacement of the respective lens groups are reduced, and the image plane which would be excessively corrected can be kept properly. Photographing close-ups can also be achieved by independently displacing the third lens group through fifth lens unit.

When the first and third lens group through fifth lens unit are to be displaced, the amounts of displacement should be determined in view of the aforesaid considerations.

Examples of the present invention will be described below.

In each of the examples, ri denotes the radius of curvature of the ith lens surface as counted from the object, di and ith inter-surface distance as counted from the object, ni and vi the refractive index and Abbe number, respectively, of the ith lens as counted from the object, fi the focal length of the ith lens group as counted from the object, bf the back focus of the entire zoom lens, $(\Sigma di + bf)_W$ the entire zoom lens length at the wide angle end, $f_T$ the focal length of the entire zoom lens at the telephoto end, $R_{1F}$ the radius of curvature of the surface of the positive lens of the second lens group which faces the object and contacts air, $R_{4,2}$ the radius of curvature of the surface of the positive lens of the fourth lens group which faces the image plane, and $R_{4,3}$ the radius of curvature of the surface of the negative lens of the fourth lens group which faces the object.

EXAMPLE 1 f = 36~131, aperture ratio = 1:4.33~5.56, field angle = 65.0°~18.2°

| i | ri | di | i | ni | vi |
|---|---|---|---|---|---|
| 1 | 237.379 | 1.6 | 1 | 1.80518 | 25.5 |
| 2 | 60.13 | 6.7 | 2 | 1.58913 | 61.3 |
| 3 | −145.218 | 0.2 | | | |
| 4 | 38.181 | 4.1 | 3 | 1.64000 | 60.2 |
| 5 | 109.906 | variable | | | |
| 6 | 99.716 | 1.2 | 4 | 1.77250 | 49.6 |
| 7 | 16.875 | 5.6 | | | |
| 8 | −50.155 | 1.3 | 5 | 1.77250 | 49.6 |
| 9 | 656.049 | 0.2 | | | |
| 10 | 25.518 | 4.2 | 6 | 1.59270 | 35.5 |
| 11 | −59.831 | 0.8 | | | |
| 12 | −35.009 | 1.1 | 7 | 1.77250 | 49.6 |
| 13 | 20.273 | 2.7 | 8 | 1.74077 | 27.8 |
| 14 | 158.762 | variable | | | |
| 15 | 52.227 | 1.9 | 9 | 1.69680 | 55.5 |
| 16 | −19999.496 | 0.2 | | | |
| 17 | 19.087 | 3.30 | 10 | 1.72000 | 50.3 |
| 18 | 106.255 | 1.20 | | | |
| 19 | −44.144 | 4.00 | 11 | 1.75520 | 27.5 |
| 20 | 34.707 | 0.80 | | | |
| 21 | 112.149 | 4.30 | 12 | 1.51680 | 64.2 |
| 22 | −29.261 | variable | | | |
| 23 | 38.873 | 5.10 | 13 | 1.56732 | 42.8 |
| 24 | −23.429 | 2.00 | | | |
| 25 | −18.390 | 1.20 | 14 | 1.83400 | 37.3 |

-continued

| f = 36~131, aperture ratio = 1:4.33~5.56, field angle = 65.0°~18.2° | | | | |
|---|---|---|---|---|
| 26 | −68.335 | variable | | |
| 27 | −14.278 | 1.60 | 15 | 1.83400 | 37.3 |
| 28 | −19.211 | | | |
| f | 36.0 | 68.673 | 131.0 |
| d5 | 0.844 | 12.585 | 23.156 |
| d14 | 23.404 | 12.791 | 2.548 |
| d22 | 5.808 | 3.531 | 3.024 |
| d26 | 7.064 | 9.342 | 9.848 |
| bf | 33.539 | 43.166 | 51.263 |

$f_1 = 66.385$, $f_2 = -18.518$, $f_3 = 33.569$, $f_4 = 116.279$, $f_5 = -78.210$, $|f_5/f_W| = 2.173$, $(\Sigma d_i + bf)_W = 125.959$, $(\Sigma d_i + bf)_W/f_T = 0.962$, $|R_{1F}/f_2| = 1.378$, $R_{4,2}/R_{4,3} = 1.274$ FIG. 1 shows the arrangement of the lens according to the Example 1.

EXAMPLE 2

| f = 36~131, aperture ratio = 1:4.6~5.6, field angle = 65.0°~18.0° | | | | | |
|---|---|---|---|---|---|
| i | ri | di | i | ni | vi |
| 1 | 180.973 | 1.32 | 1 | 1.80518 | 25.5 |
| 2 | 62.658 | 6.16 | 2 | 1.58913 | 61.3 |
| 3 | −201.201 | 0.20 | | | |
| 4 | 39.959 | 4.00 | 3 | 1.58913 | 61.3 |
| 5 | 100.434 | variable | | | |
| 6 | 49.003 | 1.20 | 4 | 1.77250 | 49.6 |
| 7 | 14.628 | 5.50 | | | |
| 8 | −75.848 | 1.10 | 5 | 1.75500 | 52.3 |
| 9 | 106.880 | 0.20 | | | |
| 10 | 21.192 | 3.50 | 6 | 1.59270 | 35.5 |
| 11 | −79.297 | 1.00 | | | |
| 12 | −31.606 | 1.10 | 7 | 1.77250 | 49.6 |
| 13 | 24.900 | 2.50 | 8 | 1.76182 | 26.6 |
| 14 | 118.848 | variable | | | |
| 15 | 51.373 | 1.96 | 9 | 1.69680 | 55.5 |
| 16 | −195.181 | 0.21 | | | |
| 17 | 19.697 | 3.04 | 10 | 1.69680 | 55.5 |
| 18 | 96.517 | 1.40 | | | |
| 19 | −40.183 | 3.90 | 11 | 1.67270 | 32.2 |
| 20 | 24.709 | 1.20 | | | |
| 21 | 109.058 | 4.40 | 12 | 1.51680 | 64.2 |
| 22 | −23.670 | variable | | | |
| 23 | 40.892 | 4.99 | 13 | 1.54072 | 47.2 |
| 24 | −22.137 | 2.00 | | | |
| 25 | −18.975 | 1.53 | 14 | 1.83400 | 37.3 |
| 26 | −79.874 | variable | | | |
| 27 | −24.495 | 2.49 | 15 | 1.69680 | 55.5 |
| 28 | −37.451 | | | | |
| f | 36.0 | 68.673 | 131.0 |
| d5 | 0.851 | 15.648 | 30.339 |
| d14 | 22.160 | 11.911 | 2.688 |
| d22 | 5.596 | 2.973 | 3.612 |
| d26 | 8.661 | 16.076 | 18.855 |
| bf | 33.403 | 36.749 | 37.040 |

Figure 2:
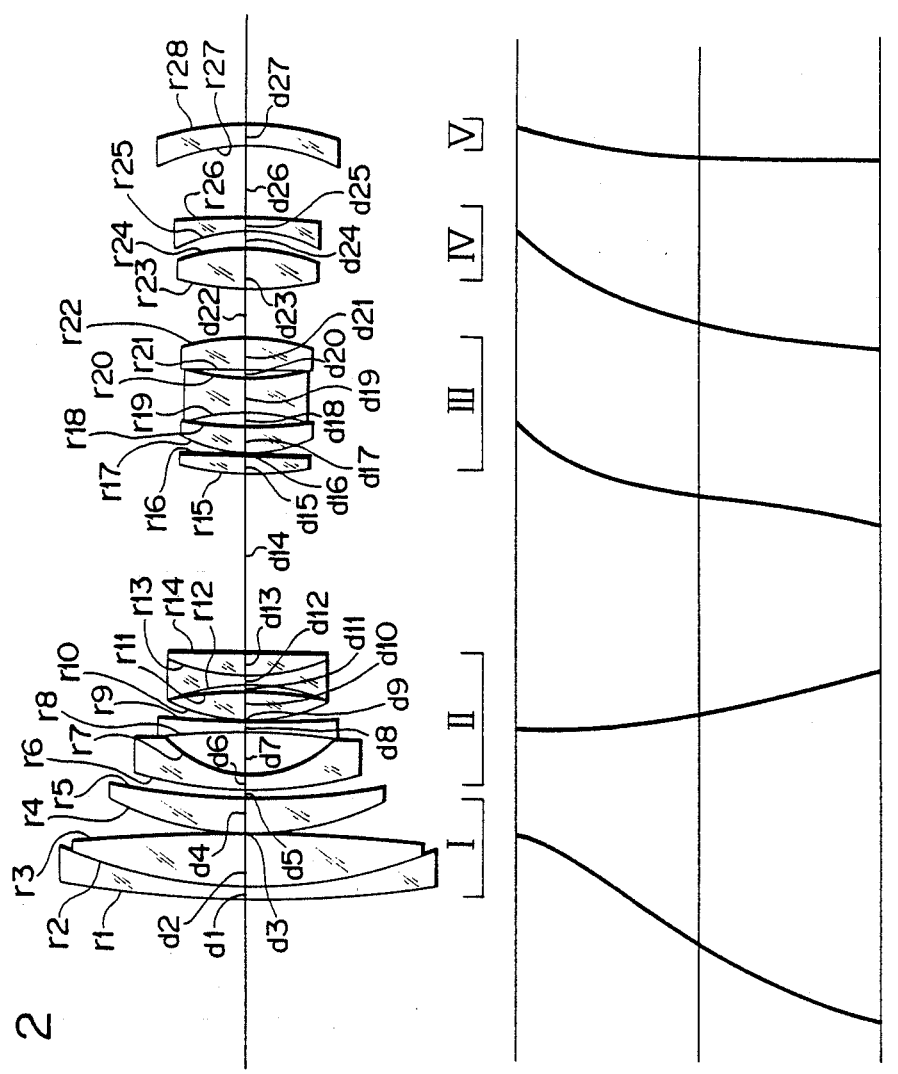
FIG. 2 is a view of a small-size zoom lens of widely variable magnification according to another example, the view also showing relative displacement of lens groups when zooming the lens.

$f_1 = 76.923$, $f_2 = -18.518$, $f_3 = 33.569$, $f_4 = 142.857$, $f_5 = -110.320$, $|f_5/f_W| = 3.064$, $(\Sigma d_i + bf)_W = 125.571$, $(\Sigma d_i + bf)_W/f_T = 0.959$, $|R_{1F}/f_2| = 1.144$, $R_{4,2}/R_{4,3} = 1.167$ FIG. 2 shows the arrangement of the lens according to the Example 2.

EXAMPLE 3

| f = 36~131, aperture ratio = 1:4.58~5.63, field angle = 65.2°~18.2° | | | | | |
|---|---|---|---|---|---|
| i | ri | di | i | ni | vi |
| 1 | 148.311 | 1.32 | 1 | 1.84666 | 23.8 |
| 2 | 61.973 | 6.16 | 2 | 1.62299 | 58.1 |
| 3 | −222.055 | 0.20 | | | |
| 4 | 37.155 | 4.00 | 3 | 1.62041 | 60.3 |

-continued

| f = 36~131, aperture ratio = 1:4.58~5.63, field angle = 65.2°~18.2° | | | | | |
|---|---|---|---|---|---|
| 5 | 69.283 | variable | | | |
| 6 | 66.906 | 1.32 | 4 | 1.75500 | 52.3 |
| 7 | 14.857 | 6.00 | | | |
| 8 | −43.768 | 1.22 | 5 | 1.64000 | 60.2 |
| 9 | 203.394 | 0.10 | | | |
| 10 | 21.662 | 6.00 | 6 | 1.59270 | 35.5 |
| 11 | −17.542 | 1.00 | 7 | 1.72916 | 54.7 |
| 12 | 59.207 | variable | | | |
| 13 | 52.349 | 2.45 | 8 | 1.69680 | 55.5 |
| 14 | −213.731 | 0.21 | | | |
| 15 | 18.574 | 3.33 | 9 | 1.64000 | 60.2 |
| 16 | 87.930 | 1.40 | | | |
| 17 | −42.002 | 3.68 | 10 | 1.67270 | 32.2 |
| 18 | 27.167 | 1.20 | | | |
| 19 | 98.708 | 4.57 | 11 | 1.51680 | 64.2 |
| 20 | −25.829 | variable | | | |
| 21 | 37.758 | 5.00 | 12 | 1.54072 | 47.2 |
| 22 | −23.442 | 2.00 | | | |
| 23 | −18.510 | 1.50 | 13 | 1.83400 | 37.3 |
| 24 | −71.031 | variable | | | |
| 25 | −19.923 | 2.49 | 14 | 1.80420 | 46.5 |
| 26 | −27.124 | | | | |
| f | 36.0 | 68.673 | 131.0 |
| d5 | 1.097 | 14.969 | 29.714 |
| d12 | 22.412 | 11.579 | 2.538 |
| d20 | 5.438 | 2.240 | 1.083 |
| d24 | 8.905 | 17.549 | 19.774 |
| bf | 32.793 | 35.621 | 37.878 |

$f_1 = 76.923$, $f_2 = 18.518$, $f_3 = 33.569$, $f_4 = 142.857$, $f_5 = -110.320$, $|f_5/f_W| = 3.064$, $(\Sigma d_i + bf)_W = 125.796$, $(\Sigma d_i + bf)_W/f_T = 0.960$, $|R_{1F}/F_2| = 1.170$, $R_{4,2}/R_{4,3} = 1.266$ FIG. 3 shows the arrangement of the lens according to the Example 3.

EXAMPLE 4

| f = 36~131, aperture ratio = 1:4.4~5.59, field angle = 65.1°~17.9° | | | | | |
|---|---|---|---|---|---|
| i | ri | di | i | ni | vi |
| 1 | 175.652 | 1.60 | 1 | 1.80518 | 25.5 |
| 2 | 58.706 | 6.20 | 2 | 1.58913 | 61.3 |
| 3 | −230.877 | 0.20 | | | |
| 4 | 43.587 | 4.10 | 3 | 1.64000 | 60.2 |
| 5 | 205.503 | variable | | | |
| 6 | 146.648 | 1.20 | 4 | 1.77250 | 49.6 |
| 7 | 16.627 | 5.60 | | | |
| 8 | −50.249 | 1.30 | 5 | 1.77250 | 49.6 |
| 9 | 51523.284 | 0.20 | | | |
| 10 | 25.518 | 4.20 | 6 | 1.59270 | 35.5 |
| 11 | −59.831 | 0.80 | | | |
| 12 | −35.289 | 1.10 | 7 | 1.74100 | 52.6 |
| 13 | 23.123 | 2.70 | 8 | 1.74077 | 27.8 |
| 14 | 128.648 | variable | | | |
| 15 | 51.101 | 1.90 | 9 | 1.69680 | 55.5 |
| 16 | −256.038 | 0.20 | | | |
| 17 | 23.855 | 3.30 | 10 | 1.71300 | 53.9 |
| 18 | 272.492 | 1.20 | | | |
| 19 | −57.766 | 4.00 | 11 | 1.75520 | 27.5 |
| 20 | 35.961 | 0.80 | | | |
| 21 | 56.773 | 4.30 | 12 | 1.48749 | 70.4 |
| 22 | −47.187 | variable | | | |
| 23 | 63.663 | 5.10 | 13 | 1.56732 | 42.8 |
| 24 | −26.639 | 3.50 | | | |
| 25 | −18.36 | 1.20 | 14 | 1.83400 | 37.3 |
| 26 | −45.207 | variable | | | |
| 27 | −16.38 | 1.60 | 15 | 1.85030 | 32.2 |
| 28 | −19.942 | | | | |
| f | 36.0 | 68.673 | 131.0 |
| d5 | 0.991 | 13.473 | 24.919 |
| d14 | 23.422 | 13.007 | 2.693 |
| d22 | 9.942 | 7.537 | 8.771 |
| d26 | 4.003 | 7.002 | 5.177 |
| bf | 34.060 | 43.012 | 50.412 |

-continued f = 36~131, aperture ratio = 1:4.4~5.59, field angle = 65.1°~17.9°

Figure 4:
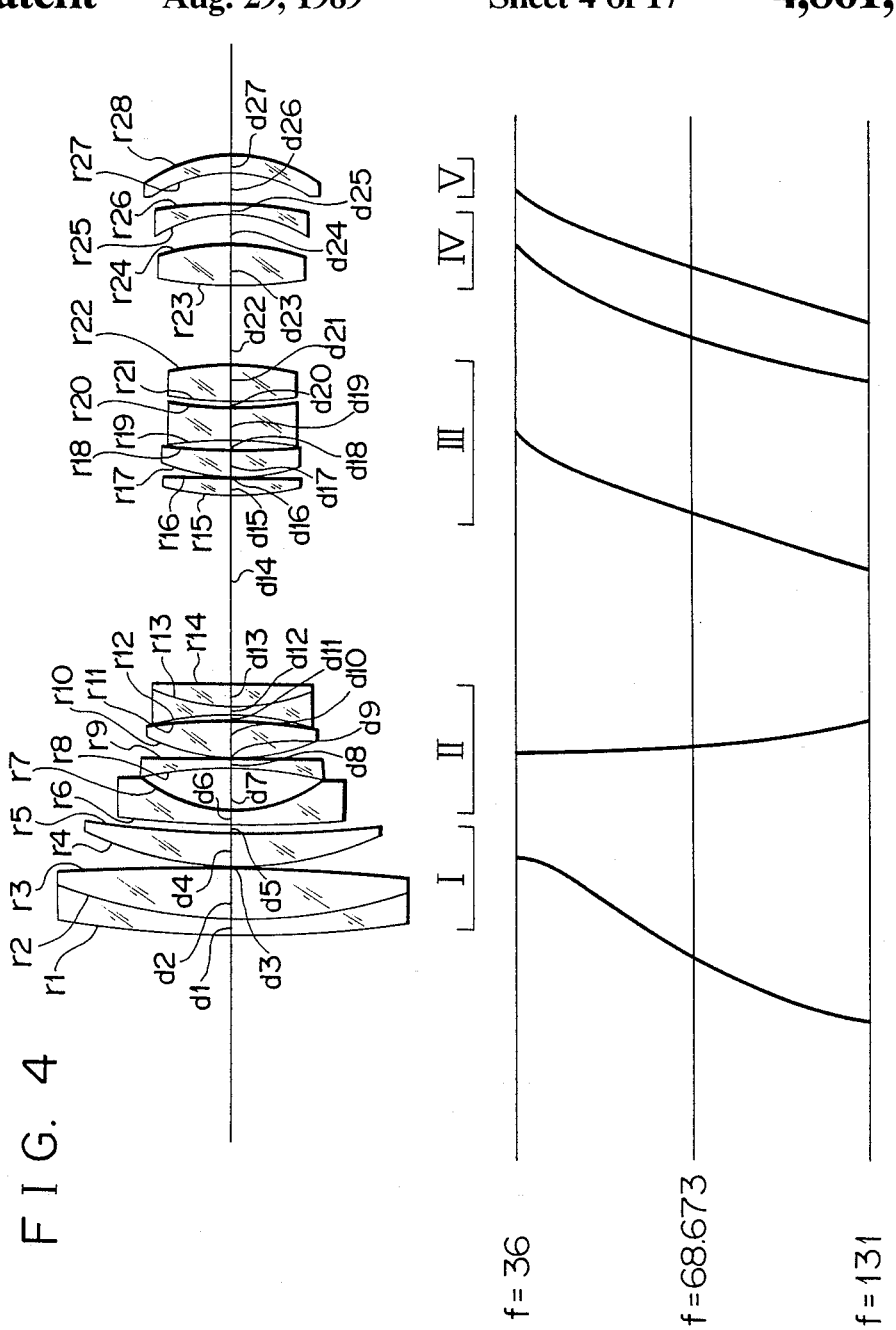
FIG. 4 is a view of a small-size zoom lens of widely variable magnification according to yet another example, the view also showing relative displacement of lens groups when zooming the lens.

$f_1 = 66.385$, $f_2 = -18.518$, $f_3 = 33.569$, $f_4 = 178.571$, $f_5 = -135.891$, $|f_5/f_W| = 3.775$, $(\Sigma di + bf)_W = 128.718$, $(\Sigma di + bf)_W/f_T = 0.983$, $|R_{\perp F}/f_2| = 1.378$, $R_{4,2}R_{4,3} = 1.451$ FIG. 4 shows the arrangement of the lens according to the Example 4.

FIGS. 1 through 8 also show relative movements of the lens groups when zooming the zoom lenses of Examples 1 through 4.

FIGS. 5 through 8 illustrate aberrations of the zoom lenses according to Examples 1 through 4, respectively. Indicated in FIGS. 5 through 8 at SA is the curve of spherical aberration, SC the curve of sine condition, S the curve relative to a sagittal ray, and M the curve relative to a meridional ray.

FIG. 9 shows the relationship between the refracting power of the fifth lens unit at the wide angle end, the distance from the rear principal point of the combined system of the first through fourth lens groups to the front principal point of the fifth lens unit, and the condition for reducing the overall length of the zoom lens while keeping a back focus.

An example for photographing close-ups will be described below.

EXAMPLE 5

The lens arrangement is the same as that of the example 1, and the amounts Z of movement in unison of the first and second lens groups for the focal lengths f: 36.0, 68.673, and 131.0, respectively, when the distance up to the object is 1.2 m are as follows:

| f | 36.0 | 68.673 | 131.0 |
|---|---|---|---|
| Z | 0.840 | 1.632 | 3.881 |

Six different modes capable of photographing close-ups based on Example 5 will be given below. In each of the modes, (a) shows the amounts of movement of the lens groups from the telephoto end, the movement toward the film surface being regarded as positive, and (b) shows the amounts of movement in unison of the first and second lens groups from the ∞ position at the telephoto end, the focusing distances up to the object, the magnifications, the distances between the lens groups, and BF (back focus: the distance from the rear lens end to the film surface).

Mode 1

| (a) | | | | | |
|---|---|---|---|---|---|
| Group Unit No. | I | II | III | IV | V |
| Displacement (mm) | 0 | −7.946 | 0 | 0 | 0 |
| (b) | | | | | |
| Movement (mm) | | 0 | 3.095 | | 4.361 |
| Distance to object (m) | | 1.2 | 0.491 | | 0.402 |
| Magnification | | −0.078 | −0.2 | | −0.25 |
| d5 | | 15.210 | 15.210 | | 15.210 |
| d14 | | 10.493 | 13.588 | | 14.854 |
| d22 | | 3.024 | 3.024 | | 3.024 |
| d26 | | 9.848 | 9.848 | | 9.848 |
| BF | | 51.263 | 51.263 | | 51.263 |

In this mode, the second lens group is displaced from the telephoto end toward the object. The displacement of the second lens group when focusing the zoom lens at a prescribed distance when there is no lens movement is large, but the amount of movement in unison of the first and second lens groups for obtaining a desired magnification may be small.

Mode 2

| (a) | | | | | |
|---|---|---|---|---|---|
| Group Unit No. | I | II | III | IV | V |
| Displacement (mm) | −2.419 | −6.047 | 0 | 0 | 0 |
| (b) | | | | | |
| Movement (mm) | | 0 | 3.319 | | 4.841 |
| Distance to object (m) | | 1.2 | 0.551 | | 0.443 |
| Magnification | | −0.091 | −0.2 | | −0.25 |
| d5 | | 19.527 | 19.527 | | 19.527 |
| d14 | | 8.595 | 11.914 | | 13.436 |
| d22 | | 3.024 | 3.024 | | 3.024 |
| d26 | | 9.848 | 9.848 | | 9.848 |
| BF | | 51.263 | 51.263 | | 51.263 |

In this mode, the second lens group is displaced together with the first lens group from the telephoto end toward the object. The amount of displacement of the second lens group when focusing the zoom lens at a prescribed distance is smaller than that in mode 1. However, the amount of lens movement for obtaining a desired magnification is increased, and so is the vignetting. The image plane is excessively corrected.

Mode 3

| (a) | | | | | |
|---|---|---|---|---|---|
| Group Unit No. | I | II | III | IV | V |
| Displacement (mm) | −2.233 | −5.582 | 0 | −0.558 | 0 |
| (b) | | | | | |
| Movement (mm) | | 0 | 3.267 | | 4.792 |
| Distance to object (m) | | 1.2 | 0.561 | | 0.451 |
| Magnification | | −0.093 | −0.2 | | −0.25 |
| d5 | | 19.806 | 19.806 | | 19.806 |
| d14 | | 8.130 | 11.397 | | 12.922 |
| d22 | | 2.466 | 2.466 | | 2.466 |
| d26 | | 10.406 | 10.406 | | 10.406 |
| BF | | 51.263 | 51.263 | | 51.263 |

In this mode, the first, second, and fourth lens groups are displaced toward the object. Since they are displaced while the magnification $\beta_4$ of the fourth lens group is satisfying the condition $|\beta_4| < 1$, the amount of displacement when zooming the zoom lens at a prescribed distance is smaller than that in mode 2. The excessively corrected image plane in mode 2 can be corrected well.

Mode 4

| (a) | | | | | |
|---|---|---|---|---|---|
| Group Unit No. | I | II | III | IV | V |
| Displacement (mm) | 0 | −4.996 | 1.998 | 1.499 | 1.998 |
| (b) | | | | | |
| Movement (mm) | | 0 | 3.425 | | 4.897 |
| Distance to object (m) | | 1.2 | 0.513 | | 0.416 |
| Magnification | | −0.084 | −0.2 | | −0.25 |
| d5 | | 18.160 | 18.160 | | 18.160 |
| d14 | | 9.542 | 12.967 | | 14.439 |
| d22 | | 2.525 | 2.525 | | 2.525 |
| d26 | | 10.347 | 10.347 | | 10.347 |
| BF | | 49.265 | 49.265 | | 49.265 |

In this mode, the second lens group is displaced toward the object, whereas the third, fourth lens group, and fifth lens unit are displaced toward the image plane.

The third lens group and fifth lens unit are displaced in unison with each other, and the fourth lens group is displaced a small amount for reducing the amounts of displacement of the lens groups or unit and correcting the image plane. The amount of displacement of the second lens group for focusing the zoom lens at a prescribed distance is much smaller.

Mode 5

| (a) | | | | | |
|---|---|---|---|---|---|
| Group Unit No. | I | II | III | IV | V |
| Displacement (mm) | 0 | −3.615 | 1.446 | 0.964 | 1.446 |
| (b) | | | | | |
| Movement (mm) | | 0 | | 4.546 | 6.097 |
| Distance to object (m) | | 2 | | 0.540 | 0.434 |
| Magnification | | −0.053 | | −0.2 | −0.25 |
| d5 | | 19.540 | | 19.540 | 19.540 |
| d14 | | 7.609 | | 12.155 | 13.706 |
| d22 | | 2.542 | | 2.542 | 2.542 |
| d26 | | 10.330 | | 10.330 | 10.330 |
| BF | | 49.817 | | 49.817 | 49.817 |

In this mode, the focusing distance when there is no lens movement is set to a far distance. The second lens group is displaced toward the object, and the third lens group, fourth lens group, and fifth lens unit are displaced toward the image plane. The third lens group and fifth lens unit are displaced in unison with each other, and the amount of displacement of the fourth lens group is reduced for reducing the amounts of displacement of the lens groups and correcting the image plane. The amounts of displacement of the lens groups are smaller than those in the mode 4, but the amount of movement in unison of the first and second lens groups is larger than that in the mode 4.

Mode 6

| (a) | | | | | |
|---|---|---|---|---|---|
| Group Unit No. | I | II | III | IV | V |
| Displacement (mm) | 0.928 | −5.570 | 2.228 | 1.857 | 2.228 |
| (b) | | | | | |
| Movement (mm) | | 0 | | 3.374 | 4.765 |
| Distance to object (m) | | 1.2 | | 0.490 | 0.399 |
| Magnification | | −0.079 | | −0.2 | −0.25 |
| d5 | | 16.657 | | 16.657 | 16.657 |
| d14 | | 10.346 | | 13.720 | 15.111 |
| d22 | | 2.653 | | 2.653 | 2.653 |
| d26 | | 10.219 | | 10.219 | 10.219 |
| BF | | 49.035 | | 49.035 | 49.035 |

In this mode, the first lens unit is displaced toward the image plane when the second lens group is displaced toward the object, whereas the third lens group, fourth lens group, and fifth lens unit are displaced toward the image plane to focus the zoom lens at a close distance. By displacing the first lens group toward the image plane, the amounts of displacement of the second, third lens group, fourth lens group, and fifth lens unit for focusing the zoom lens at the given distance are increased. Since, however, the distance between the first and second lens groups is reduced, the amount of movement in unison of the first and second lens group, which is required to obtain a prescribed macro magnification, may be small.

FIG. 10 shows the arrangement of the zoom lens of the example 5 at the wide angle end, relative movement of the lens groups upon zooming lens, and movement of the lens groups for photographing a close-up in the mode 1.

Figure 5:
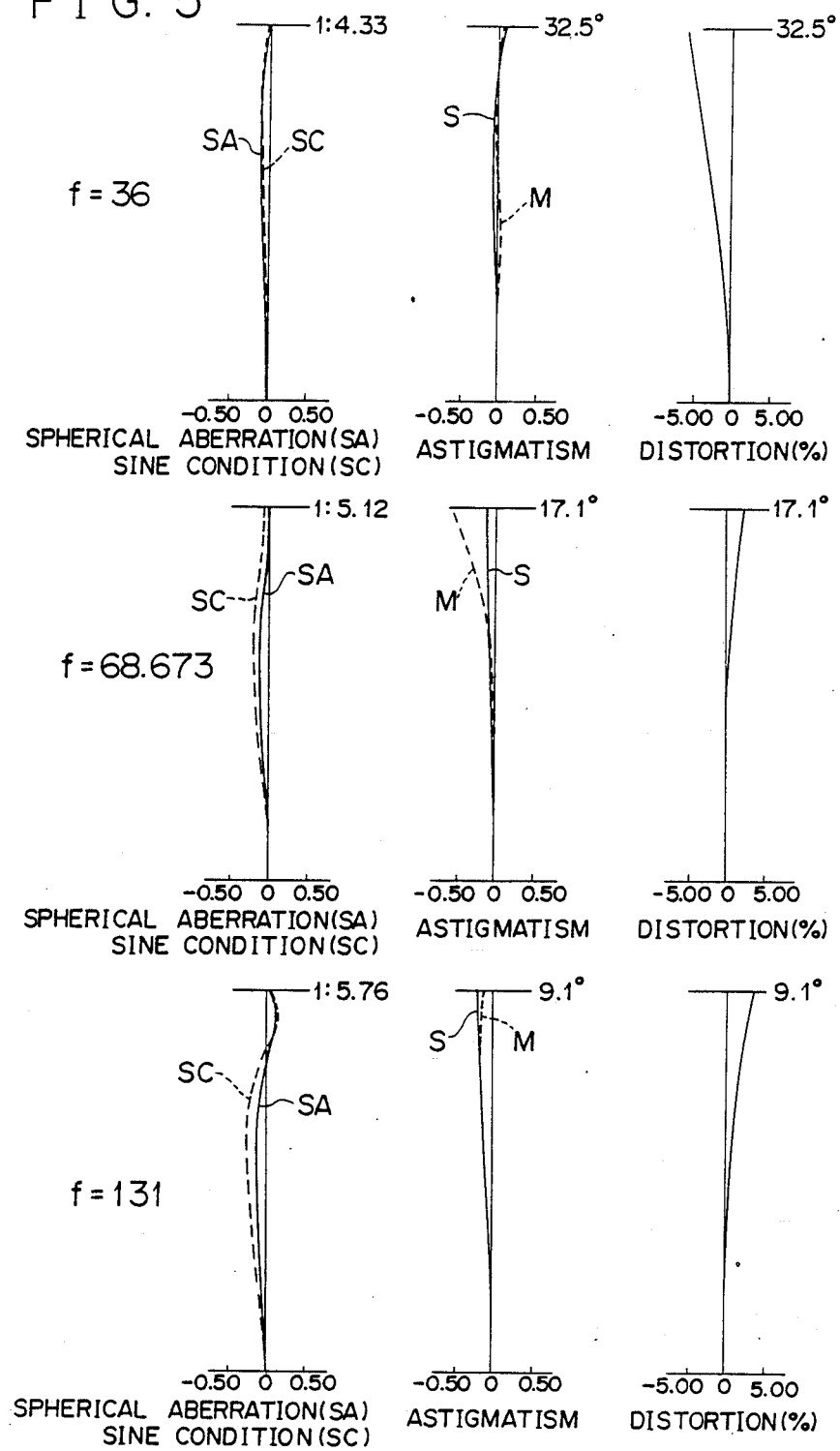
FIG. 5 is a diagram showing aberrations of the zoom lens shown in FIG. 1.
Figure 6:
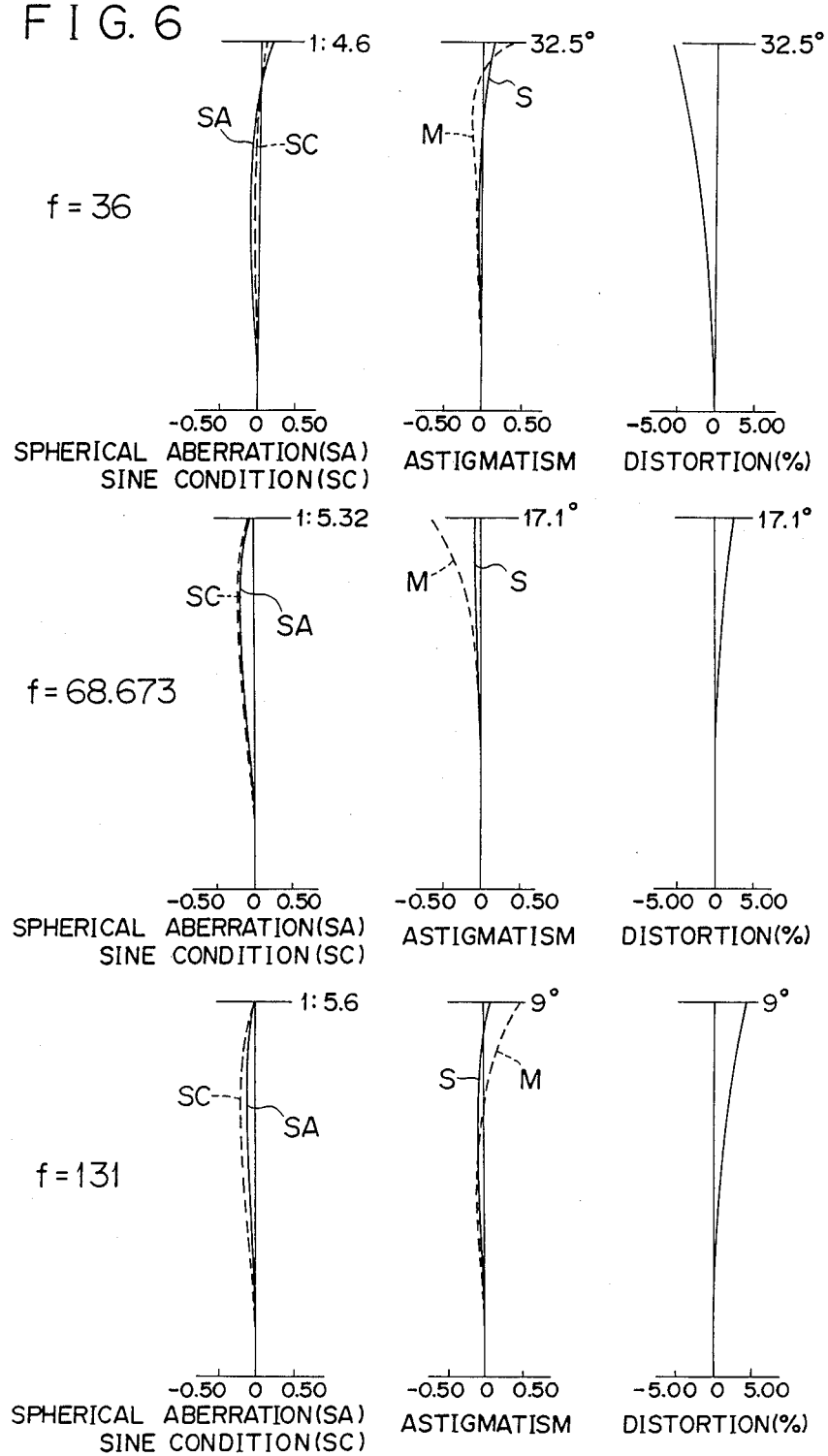
FIG. 6 is a diagram showing aberrations of the zoom lens illustrated in FIG. 2.
Figure 7:
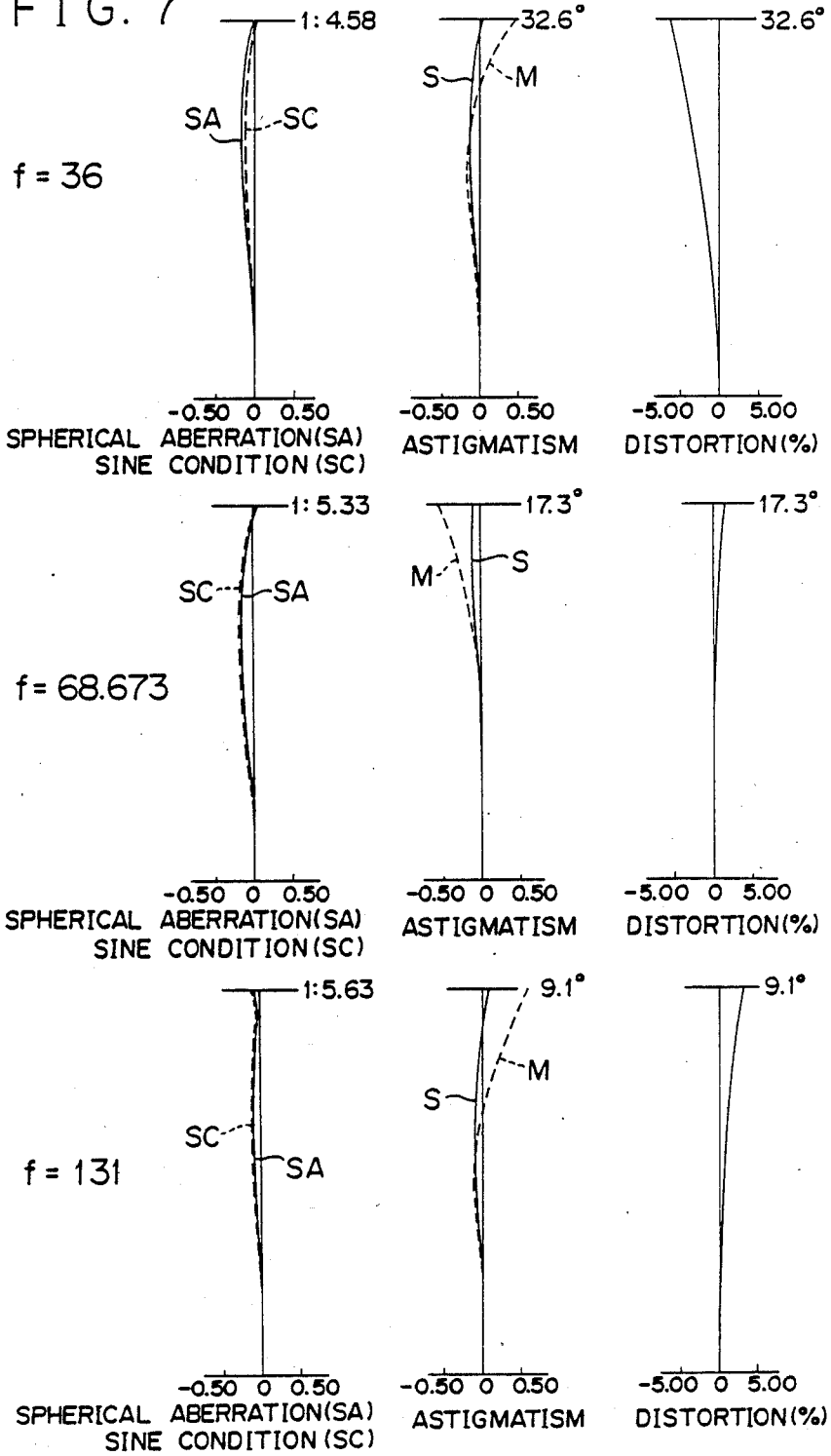
FIG. 7 is a diagram showing aberrations of the zoom lens shown in FIG. 3.
Figure 8:
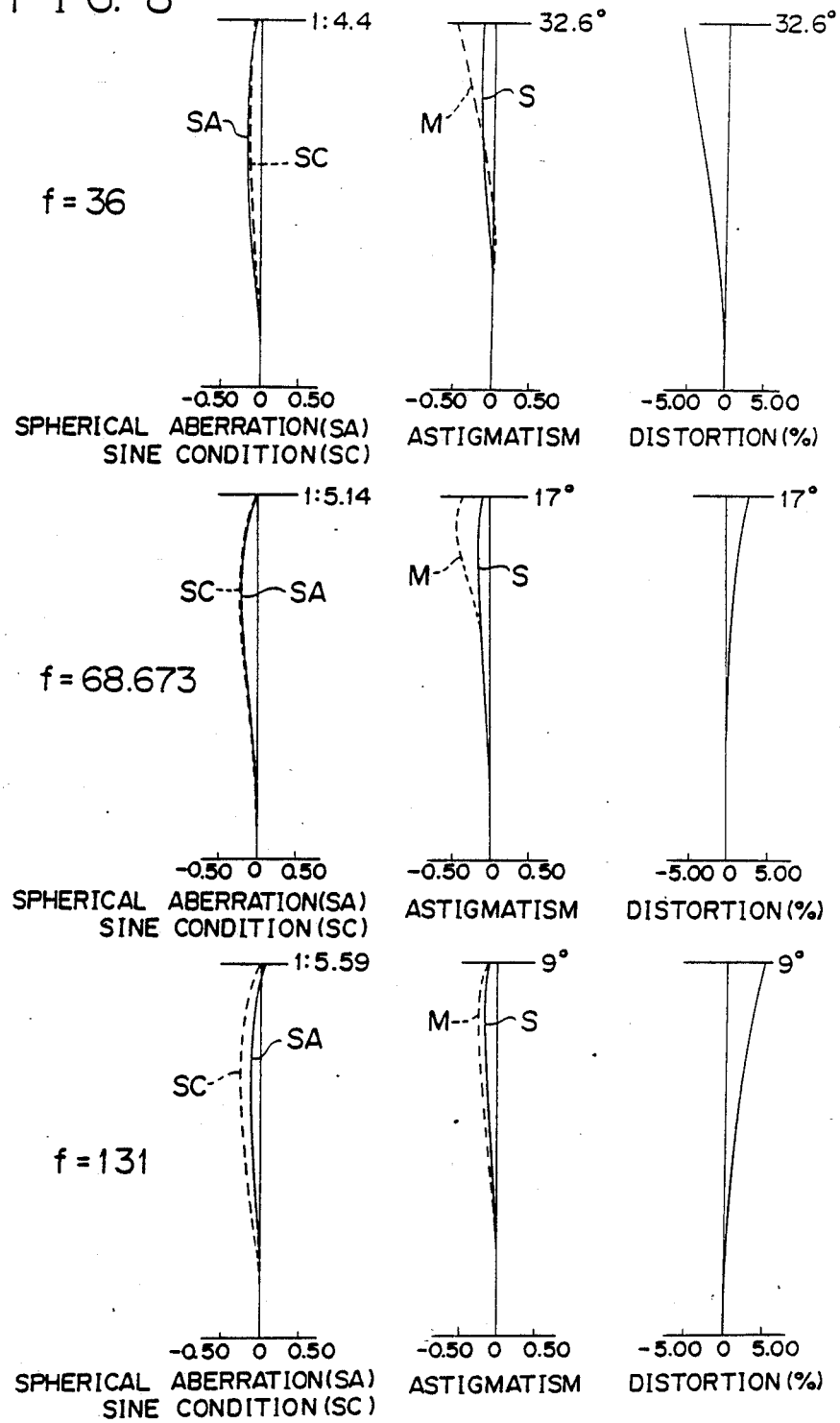
FIG. 8 is a diagram showing aberrations of the zoom lens illustrated in FIG. 4.
Figure 11:
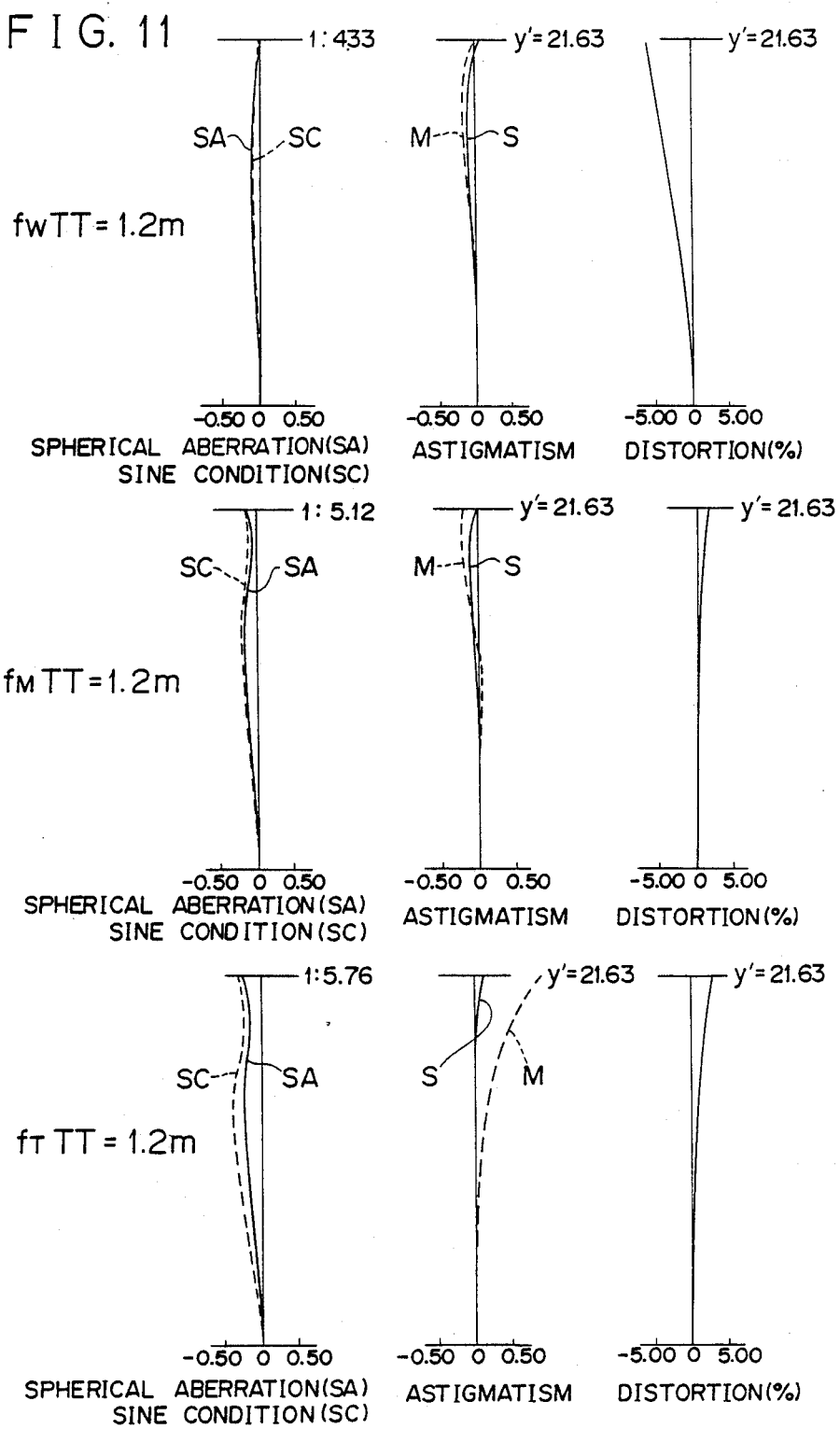
FIG. 11 is a diagram showing aberrations of the zoom lens of FIG. 10 at a wide angle end, an intermediate focal length, and a telephoto end when the distance to the object is 1.2 m.
Figure 12:
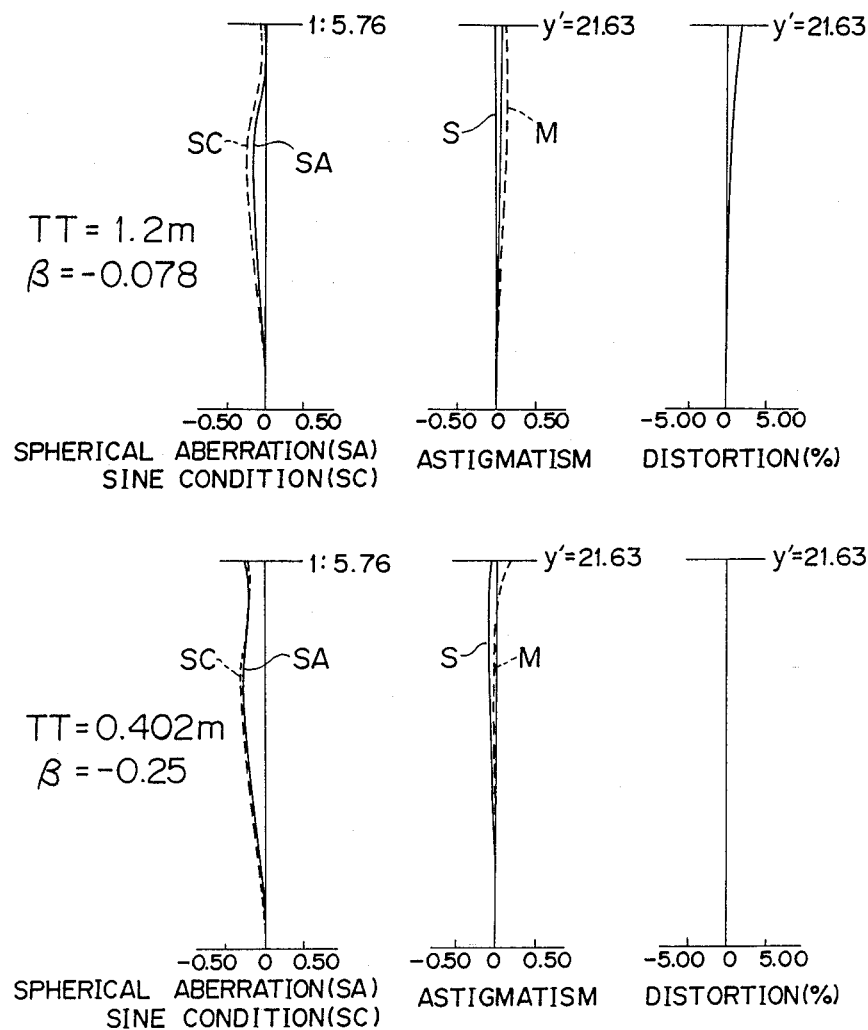
Figure 13:
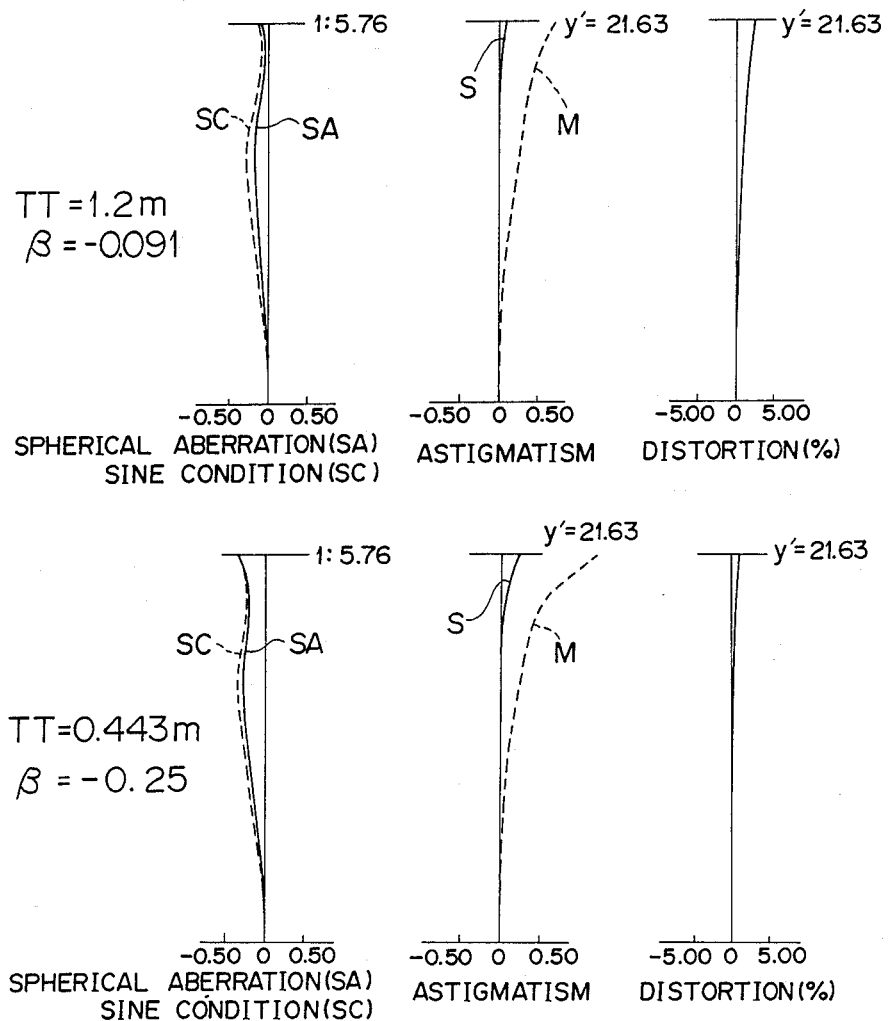
Figure 15:
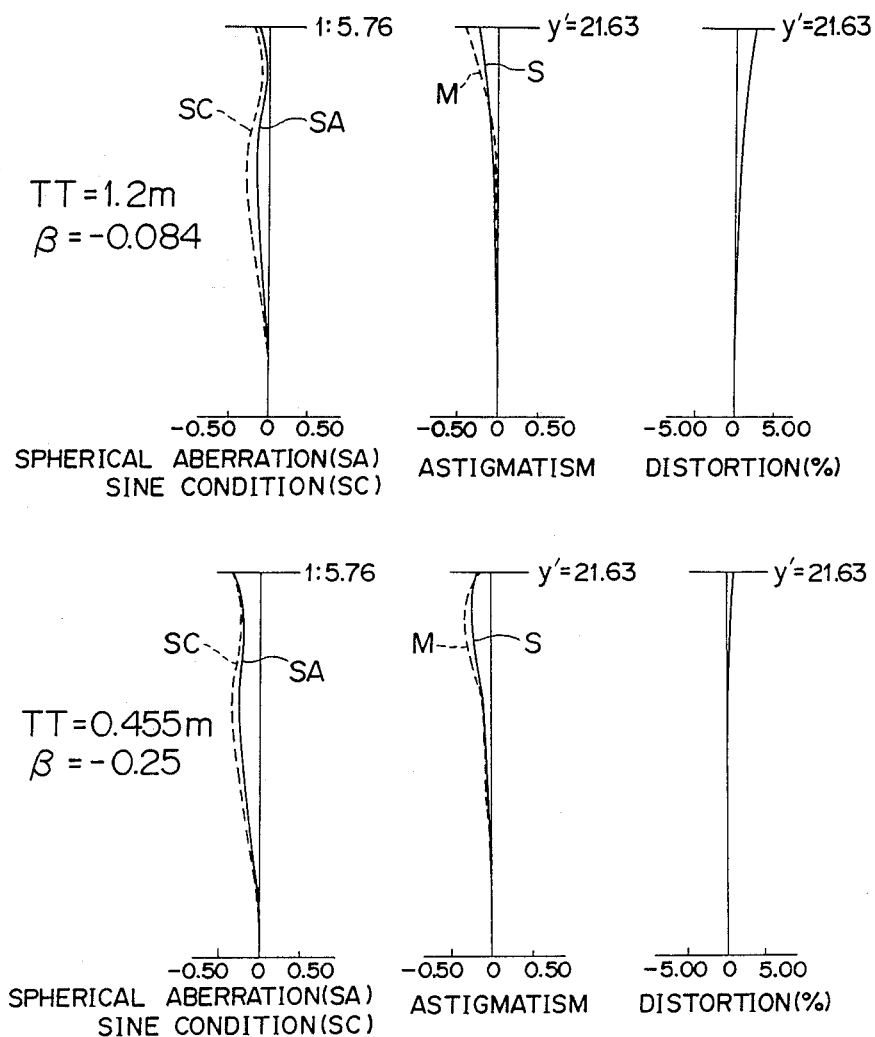
Figure 17:
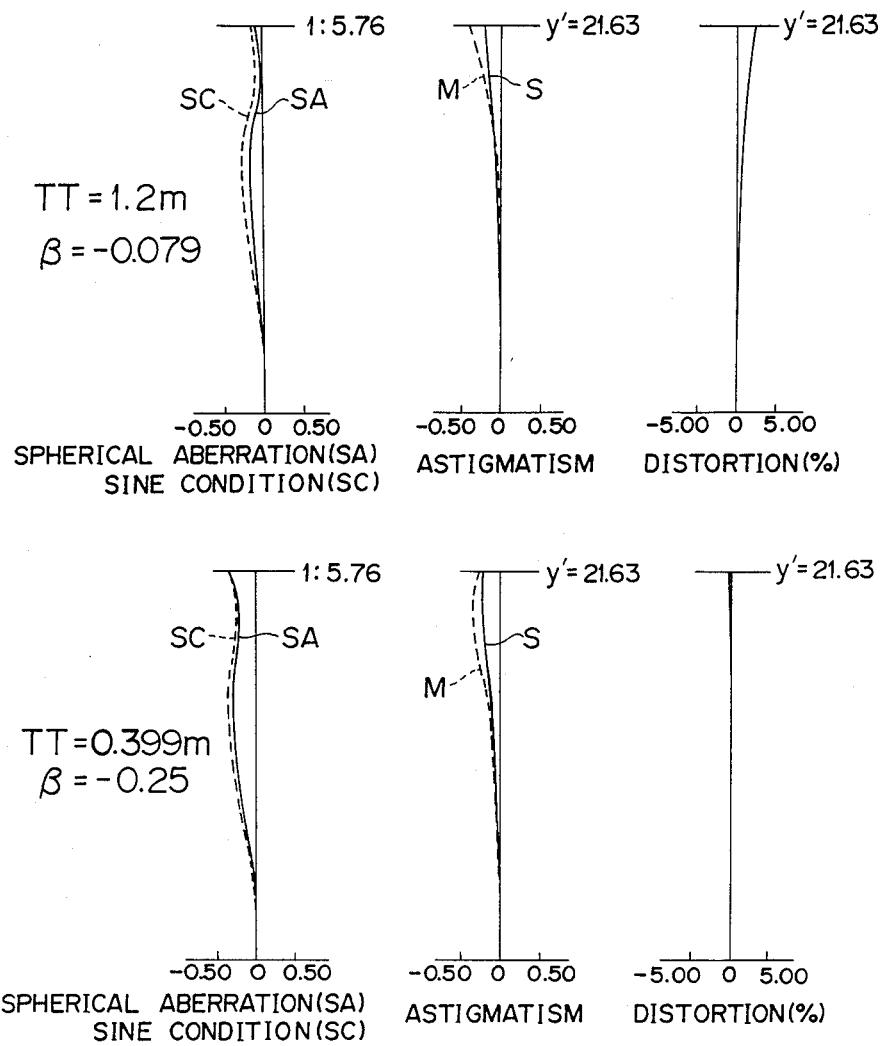

FIG. 11 shows aberration curves of the example 5 when the distance up to the object is 1.2 m. The aberration curves of this zoom lens when set to infinity at the wide angle end, the intermediate focal length, and the telephoto end, respectively, are shown in FIG. 5. Represented in FIG. 11 at $f_W$ is the focal length of the entire zoom lens at the wide angle end, $f_M$ the focal length of the entire zoom lens at the intermediate focal length, and $f_T$ the focal length of the entire zoom lens at the telephoto end.

FIGS. 12 through 17 show aberrations of the lenses according to the modes 1 through 6, respectively.

In FIGS. 12 through 17, the aberration curves are plotted when there is no movement in unison of the first and second lens groups, and when the magnification of the entire zoom lens is −0.25. SA indicates the curves of spherical aberration, SC the curves of sine condition, S the curves relative to sagittal ray, M the curves relative to meridional ray, TT the distance from the object to the film surface, and $\beta$ the magnification of the entire zoom lens.

Although certain preferred embodiments have been shown and described, it should be understood that many changes and modifications may be made therein without departing from the scope of the appended claims.

What is claimed is:

1. A zoom lens comprising, successively in order from an object toward an image, a first lens group having positive refracting power, a second lens group having negative refracting power, a third lens group having positive refracting power, a fourth lens group having positive refracting power, and a fifth lens unit having negative refracting power, said first lens group, said third lens group, said fourth lens group, and said fifth lens unit being movable toward the object, and said second lens group being movable toward the image for zooming the zoom lens from a wide angle setting toward a telephoto setting, said zoom lens meeting the following conditions:

(i) $1.5 < |f_5/f_W| < 6$ (ii) $f_4 > |f_5|$ (iii) $D_{3W} < D_{3M}$ where $f_4$ is the focal length of the fourth lens group, $f_5$ is the focal length of the fifth lens unit, $f_W$ is the focal length of the zoom lens at the wide angle end, $D_{3W}$ is the distance between the third and fourth lens at the wide angle end, and $D_{3M}$ is the distance between the third and fourth lens groups when the focal length of the zoom lens is $$f_M = \sqrt{f_W \cdot f_T}$$

where $f_T$ is the focal length of the zoom lens at the telephoto end.

2. A zoom lens according to claim 1, wherein said third lens group and fifth lens unit are movable in unison with each other.

3. A zoom lens according to claim 1, wherein said second lens group comprises three negative lenses and one or more positive lenses, the first lens being a meniscus negative lens having a concave surface facing the image plane and the second lens being a negative lens having a concave lens facing the object, wherein assuming that the radius of curvature of the surface, facing the object and contacting air, of the positive lens of the second lens group is $R_{1F}$, and the focal length of the second lens group is $f_2$, the following composition is met:

$$1 < |R_{1F}/f_2| < 1.6$$

wherein said fourth lens group includes a first lens comprising a double-convex lens having a surface of small radius of curvature which faces the image plane and a second lens comprising a meniscus negative lens with its concave surface facing the object, and wherein assuming that the radius of curvature of the surface of the positive first lens which faces the image plane is $R_{4,2}$, and the radius of curvature of the surface of the second negative lens which faces the object is $R_{4,3}$, the following condition is met:

$$1.1 < R_{4,2}/R_{4,3} < 1.8$$

4. A zoom lens according to claim 3, wherein said third lens group and fifth lens unit are movable in unison with each other.

5. A zoom lens for photographing close-ups, comprising, successively in order from an object toward an image, a first lens group having positive refracting power, a second lens group having negative refracting power, a third lens group having positive refracting power, a fourth lens group having positive refracting power, and a fifth lens unit having negative refracting power, said first lens group, said third lens group, said fourth lens group, and said fifth lens unit being movable toward the object, and said second lens group being movable toward the image for zooming the zoom lens from a wide angle setting toward a telephoto setting, the arrangement being such that at least said second lens group is displaced a predetermined distance from the telephoto setting toward the object, outside of a zooming range, and fixed to the displaced position for photographing close-ups, that the zoom lens is focused, in the zooming range and also for photographing close-ups, by moving said first and second lens groups in unison with each other, and that for photographing close-ups, said zoom lens can be focused to close ranges in excess of an ordinary photographing range.

* * * * *